US011051292B2

(12) United States Patent
Hosseini et al.

(10) Patent No.: US 11,051,292 B2
(45) Date of Patent: Jun. 29, 2021

(54) CONTROL CHANNEL LIMITATIONS FOR ENHANCED LOW LATENCY PROCESSING

(71) Applicant: QUALCOMM Incorporated, San Diego, CA (US)

(72) Inventors: Seyedkianoush Hosseini, San Diego, CA (US); Huilin Xu, San Diego, CA (US); Hari Sankar, San Diego, CA (US); Jing Jiang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/678,845

(22) Filed: Nov. 8, 2019

(65) Prior Publication Data
US 2020/0154413 A1      May 14, 2020

Related U.S. Application Data

(60) Provisional application No. 62/759,986, filed on Nov. 12, 2018.

(51) Int. Cl.
*H04W 72/04* (2009.01)
*H04W 76/11* (2018.01)
(Continued)

(52) U.S. Cl.
CPC ......... *H04W 72/042* (2013.01); *H04L 5/0051* (2013.01); *H04L 5/0094* (2013.01);
(Continued)

(58) Field of Classification Search
CPC ........... H04W 72/042; H04W 72/0446; H04W 76/11; H04W 24/08; H04L 5/0051; H04L 5/0094; H04L 5/0092
See application file for complete search history.

(56) References Cited

U.S. PATENT DOCUMENTS

2018/0324770 A1    11/2018 Nogami et al.
2019/0349904 A1    11/2019 Kwak et al.
(Continued)

FOREIGN PATENT DOCUMENTS

WO    WO-2018201892 A1    11/2018
WO    WO-2019056164 A1    3/2019

OTHER PUBLICATIONS

International Search Report and Written Opinion—PCT/US2019/060782—ISA/EPO—Feb. 18, 2020.

*Primary Examiner* — Wei Zhao
(74) *Attorney, Agent, or Firm* — Holland & Hart LLP

(57) ABSTRACT

Methods, systems, and devices for wireless communications are described. In some wireless communications systems, a user equipment (UE) may be configured with multiple control resource sets (CORESETs) within a slot. The UE may identify a set of physical downlink control channel (PDCCH) occasions to monitor within the slot, where each PDCCH occasion corresponds to a search space set for a CORESET. The UE may determine a first configuration and a second configuration for monitoring the PDCCH occasions, where the first configuration corresponds to slot-based thresholds and the second configuration corresponds to symbol-based or occasion-based thresholds for monitoring. These thresholds may specify a threshold number of PDCCH candidates to blind decode, a threshold number of non-overlapping control channel elements (CCEs) to perform channel estimation for, or both, where the threshold numbers support low latency processing at the UE. Either the configuration or the UE may enforce the thresholds.

30 Claims, 12 Drawing Sheets

(51) Int. Cl.
*H04L 5/00* (2006.01)
*H04W 24/08* (2009.01)

(52) U.S. Cl.
CPC ....... *H04W 24/08* (2013.01); *H04W 72/0446* (2013.01); *H04W 76/11* (2018.02)

(56) References Cited

U.S. PATENT DOCUMENTS

2020/0100248 A1* 3/2020 Kim .................. H04W 72/0453
2020/0153672 A1* 5/2020 Choi .................. H04W 72/042
2020/0221428 A1* 7/2020 Moon ....................... H04L 5/00

* cited by examiner

CONTROL CHANNEL LIMITATIONS FOR ENHANCED LOW LATENCY PROCESSING

CROSS REFERENCE

The present Application for Patent claims the benefit of U.S. Provisional Patent Application No. 62/759,986 by HOSSEINI et al., entitled "CONTROL CHANNEL LIMITATIONS FOR ENHANCED LOW LATENCY PROCESSING," filed Nov. 12, 2018, assigned to the assignee hereof, and expressly incorporated herein.

BACKGROUND

The following relates generally to wireless communications, and more specifically to control channel limitations for enhanced low latency processing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may configure a search space of physical downlink control channel (PDCCH) candidates to carry downlink control information (DCI) to a user equipment (UE). In some cases, the base station may configure multiple PDCCH candidates in multiple search spaces for the UE to search, and the UE may perform several channel estimations and blind decoding attempts to receive scheduled DCI. However, in some cases, the number of channel estimations or blind decoding attempts required to be performed by the UE within a particular duration may be burdensome for the UE. For instance, the UE's performance may be affected due to a large number of channel estimations or decoding attempts performed within a relatively short duration, which may impact latency and efficiency in wireless communications by the UE. If the UE is configured with a response time based on a low latency processing timeline, the large number of channel estimations or decoding attempts may not allow the UE to complete processing according to the configured low latency processing timeline.

SUMMARY

The described techniques relate to improved methods, systems, devices, and apparatuses that support control channel limitations for enhanced low latency processing. Generally, the described techniques provide for a user equipment (UE) to support low latency processing timelines despite monitoring occasions of search space sets associated with different control resource sets (CORESETs) overlapping in time. For example, in some wireless communications systems, a UE may be configured with multiple CORESETs within a slot. The UE may identify a set of physical downlink control channel (PDCCH) occasions to monitor within the slot, where each PDCCH occasion corresponds to a search space set for a CORESET. The UE may determine a first configuration and a second configuration for monitoring the PDCCH occasions, where the first configuration corresponds to slot-based thresholds and the second configuration corresponds to symbol-based or occasion-based thresholds for monitoring. These thresholds may specify a threshold number of PDCCH candidates to blind decode, a threshold number of non-overlapping control channel elements (CCEs) to perform channel estimation for, or both, where the threshold numbers support low latency processing at the UE. Either a base station (e.g., when configuring the UE) or the UE may apply the thresholds. For example, if the PDCCH candidates and CCEs are less than or equal to the thresholds, the UE may perform processing according to a low latency processing timeline. If not, the UE may reduce the number of candidates or CCEs that it processes or may fallback to a more relaxed processing timeline to handle the high processing overhead.

A method for wireless communication is described. The method may include identifying a set of PDCCH occasions for a slot, each PDCCH occasion associated with one of a set of CORESETs and one of a set of search space sets, determining a first configuration for monitoring the set of PDCCH occasions, the first configuration including a threshold number of PDCCH candidates, or a threshold number of non-overlapping CCEs, or a combination thereof, within the slot, and determining a second configuration for monitoring PDCCH occasions of the set of PDCCH occasions that overlap for at least one symbol period during the slot. The method may further include monitoring, in accordance with the first configuration and the second configuration, for control information during the set of PDCCH occasions and decoding the control information identified within a first PDCCH occasion of the set of PDCCH occasions.

An apparatus for wireless communication is described. The apparatus may include a processor, memory coupled with the processor, and instructions stored in the memory. The instructions may be executable by the processor to cause the apparatus to identify a set of PDCCH occasions for a slot, each PDCCH occasion associated with one of a set of CORESETs and one of a set of search space sets, determine a first configuration for monitoring the set of PDCCH occasions, the first configuration including a threshold number of PDCCH candidates, or a threshold number of non-overlapping CCEs, or a combination thereof, within the slot, and determine a second configuration for monitoring PDCCH occasions of the set of PDCCH occasions that overlap for at least one symbol period during the slot. The instructions may be further executable by the processor to cause the apparatus to monitor, in accordance with the first configuration and the second configuration, for control information during the set of PDCCH occasions and decode the control information identified within a first PDCCH occasion of the set of PDCCH occasions.

Another apparatus for wireless communication is described. The apparatus may include means for identifying a set of PDCCH occasions for a slot, each PDCCH occasion associated with one of a set of CORESETs and one of a set of search space sets, determining a first configuration for monitoring the set of PDCCH occasions, the first configuration including a threshold number of PDCCH candidates, or a threshold number of non-overlapping CCEs, or a combination thereof, within the slot, and determining a second configuration for monitoring PDCCH occasions of the set of PDCCH occasions that overlap for at least one symbol period during the slot. The apparatus may further include means for monitoring, in accordance with the first configuration and the second configuration, for control information during the set of PDCCH occasions and decoding the control information identified within a first PDCCH occasion of the set of PDCCH occasions.

A non-transitory computer-readable medium storing code for wireless communication is described. The code may include instructions executable by a processor to identify a set of PDCCH occasions for a slot, each PDCCH occasion associated with one of a set of CORESETs and one of a set of search space sets, determine a first configuration for monitoring the set of PDCCH occasions, the first configuration including a threshold number of PDCCH candidates, or a threshold number of non-overlapping CCEs, or a combination thereof, within the slot, and determine a second configuration for monitoring PDCCH occasions of the set of PDCCH occasions that overlap for at least one symbol period during the slot. The code may further include instructions executable by the processor to monitor, in accordance with the first configuration and the second configuration, for control information during the set of PDCCH occasions and decode the control information identified within a first PDCCH occasion of the set of PDCCH occasions.

Some examples of the method, apparatuses, and non-transitory computer-readable medium described herein may further include operations, features, means, or instructions for identifying that the first PDCCH occasion is associated with a first processing timeline, the first PDCCH occasion overlapping with a second PDCCH occasion of the set of PDCCH occasions, and communicating, based on the control information, according to a second processing timeline based on determining that a threshold of the second configuration is satisfied for the at least one symbol period.

Some examples of the method, apparatuses, and non-transitory computer-readable medium described herein may further include operations, features, means, or instructions for determining that a threshold of the second configuration is satisfied for the at least one symbol period, where the monitoring includes pruning at least one PDCCH decoding candidate from at least one of the PDCCH occasions that overlap for the at least one symbol period based on a priority of the set of search space sets. In some examples of the method, apparatuses, and non-transitory computer-readable medium described herein, the priority of the set of search space sets may be based on a protocol type associated with the PDCCH occasions that overlap for the at least one symbol period.

In some examples of the method, apparatuses, and non-transitory computer-readable medium described herein, the second configuration includes a threshold number of PDCCH candidates within the PDCCH occasions that overlap for the at least one symbol period during the slot. In some examples of the method, apparatuses, and non-transitory computer-readable medium described herein, the second configuration includes a threshold number of frequency resources spanned by the PDCCH occasions within each symbol period of the at least one symbol period.

In some examples of the method, apparatuses, and non-transitory computer-readable medium described herein, the second configuration includes a threshold number of frequency resources including a reference signal associated with demodulating PDCCH candidates in the set of PDCCH occasions. In some examples of the method, apparatuses, and non-transitory computer-readable medium described herein, the reference signal may be transmitted in each cluster of each CORESET of the set of CORESETs having one or more CCEs of the set of PDCCH occasions.

Some examples of the method, apparatuses, and non-transitory computer-readable medium described herein may further include operations, features, means, or instructions for determining a per symbol group metric for the PDCCH occasions based on a segmentation of a sum of PDCCH candidates or frequency resources across symbol groups of the at least one symbol period. In some examples of the method, apparatuses, and non-transitory computer-readable medium described herein, each of the symbol groups of the at least one symbol period corresponds to a single symbol period.

In some examples of the method, apparatuses, and non-transitory computer-readable medium described herein, the second configuration includes a threshold, the threshold being applied for each of a set of active bandwidth parts (BWPs) of a carrier, for each carrier of a set of configured carriers, or for a group of carriers. Some examples of the method, apparatuses, and non-transitory computer-readable medium described herein may further include operations, features, means, or instructions for determining a metric for the PDCCH occasions based on a sum of PDCCH candidates or frequency resources across carriers of the group of carriers sharing a numerology for the PDCCH occasions.

In some examples of the method, apparatuses, and non-transitory computer-readable medium described herein, the second configuration includes a threshold that may be based on a subcarrier spacing for the set of CORESETs. In some examples of the method, apparatuses, and non-transitory computer-readable medium described herein, the monitoring includes applying a threshold of the second configuration to PDCCH occasions associated with a subset of the set of CORESETs that may be associated with a first protocol type. In some examples of the method, apparatuses, and non-transitory computer-readable medium described herein, the second configuration includes a threshold that may be based on a number of PDCCH occasions.

Some examples of the method, apparatuses, and non-transitory computer-readable medium described herein may further include operations, features, means, or instructions for identifying that the first PDCCH occasion is associated with a first processing timeline and communicating, based on the control information, according to a second processing timeline based on determining that a length of a CORESET associated with the first PDCCH occasion satisfies a threshold.

Some examples of the method, apparatuses, and non-transitory computer-readable medium described herein may further include operations, features, means, or instructions for identifying a DCI format or a radio network temporary identifier (RNTI) associated with a first search space set of the set of search space sets is associated with a first processing timeline and suppressing monitoring for the DCI format or the RNTI based on determining that a length of a CORESET associated with the first PDCCH occasion satisfies a threshold.

DETAILED DESCRIPTION

Figure 1:
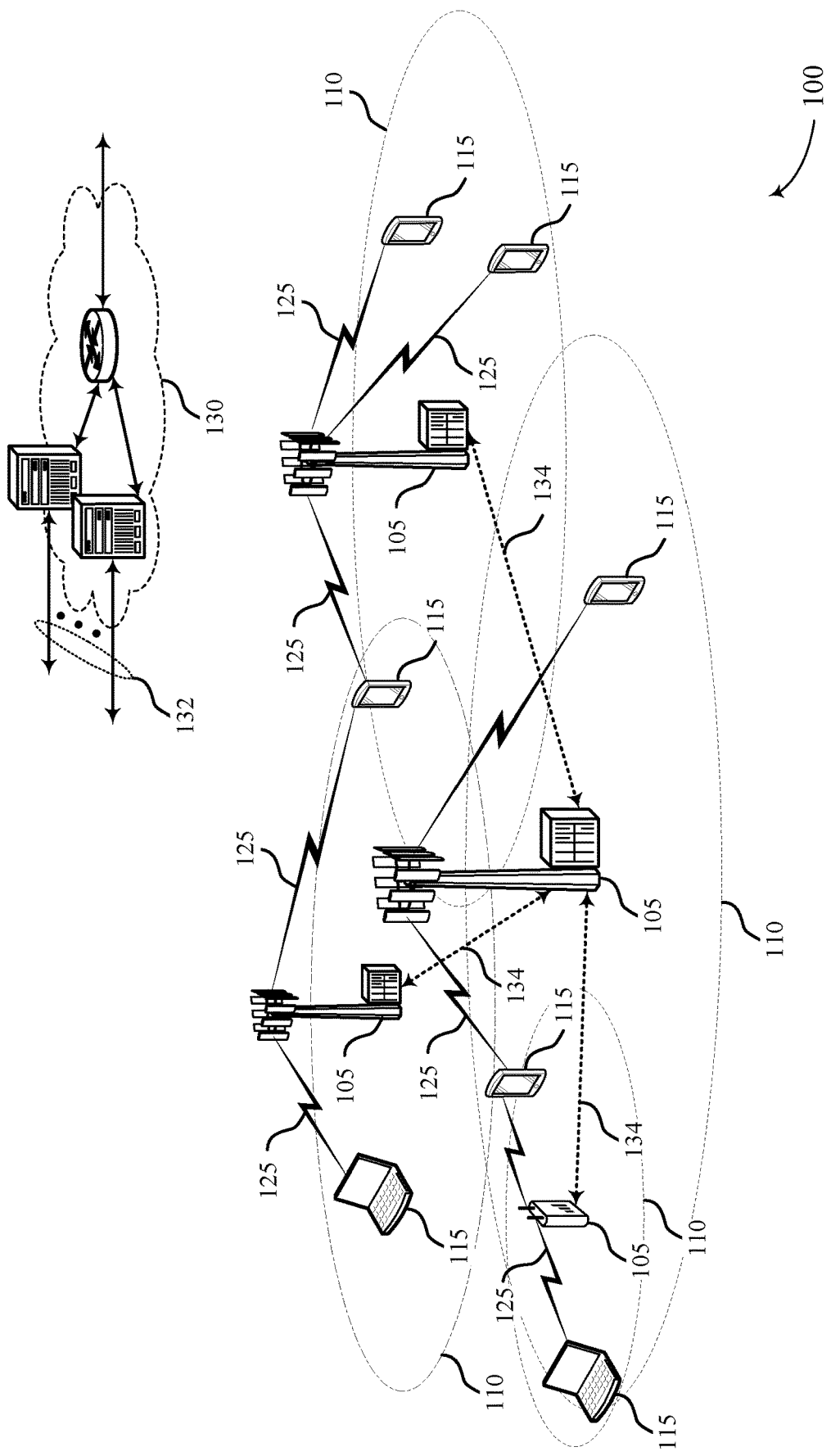
FIGS. 1 and 2 illustrate examples of wireless communications systems that support control channel limitations for enhanced low latency processing in accordance with aspects of the present disclosure.

In some wireless communications systems, a base station may configure a search space set for transmission of downlink control information (DCI) to a user equipment (UE). The search space set may include a number of physical downlink control channel (PDCCH) blind decoding candidates at multiple aggregation levels (ALs). In some cases, the base station may configure multiple search space sets for transmission of DCI to the UE within a control resource set (CORESET). Additionally, the base station may configure multiple CORESETs within a same slot (e.g., within each slot) for the UE. While monitoring occasions of search space sets for a same CORESET may not overlap in time, monitoring occasions of search space sets for different CORESETs may partially or fully overlap for one or more symbols in a slot. A high number of blind decoding candidates or resources for channel estimation may increase processing latency at the UE. If these candidates or resources are concentrated in overlapping search space sets for different CORESETs, a UE configured for low latency processing may be unable to process the configured PDCCH candidates and control channel elements (CCEs) within the allocated timeframe.

To handle the overlapping PDCCH occasions for different CORESETs, a base station, a UE, or both may implement different thresholds according to one or more configurations. For example, in a first configuration, the base station, UE, or both may implement slot-based thresholds. The slot-based thresholds may indicate a maximum number of PDCCH candidates, non-overlapping CCEs, or both for a slot. However, this configuration may not identify high densities of PDCCH candidates or CCEs within a symbol or monitoring occasion within a slot, may not identify when monitoring occasions of search space sets associated with different CORESETs overlap in time within a slot, or both. To handle such scenarios, the base station, UE, or both may implement symbol-based or occasion-based thresholds. For example, a symbol-based threshold may specify a maximum number of CCEs for channel estimation within a symbol or set of symbols. An occasion-based threshold may specify a maximum number of PDDCH candidates to attempt to blind decode when monitoring occasions of search space sets for different CORESETs overlap in time. These thresholds may identify high densities of blind decoding candidates, CCEs, or both across CORESETs within specific symbol periods of a slot.

In some cases, the network may apply these thresholds. For example, a base station may configure a UE with CORESETs such that the PDCCH candidates and CCEs for the configuration of the CORESETs do not exceed the thresholds (e.g., summed across the configured CORESETs). In other cases, the base station may generate a configuration such that the configuration exceeds one or more of the thresholds. In these cases, a UE may check the thresholds based on the configurations. If the UE identifies a number of PDCCH candidates or a number of CCEs exceeding one of the occasion-based or symbol-based thresholds (e.g., across the multiple CORESETs), the UE may modify a process of the UE. For example, the UE may refrain from monitoring certain candidates or estimating certain frequency resources to reduce the processing latency and reduce the numbers of candidates and CCEs below the thresholds. In another example, the UE may fallback from an enhanced ultra-reliable low latency communication (URLLC) processing timeline to a more relaxed timeline (e.g., an enhanced mobile broadband (eMBB) processing timeline) to handle the large number of PDCCH candidates in a monitoring occasion or the large number of CCEs for channel estimation in a symbol. For example, for enhanced URLLC, the UE may operate according to a hybrid automatic repeat request (HARD) timeline and/or physical uplink shared channel (PUSCH) timeline that is shorter than an existing or legacy capability (e.g., capability timing 2 specified in Release 15 for the 3rd Generation Partnership Project (3GPP)). Additionally or alternatively, the UE may operate according to a channel state information (CSI) preparation timeline that is shorter than an existing or legacy delay requirement (e.g., delay requirement 1 specified in 3GPP Release 15). If the UE falls back to the more relaxed timeline, the UE may operate according to the legacy or existing values (e.g., the values specified in the 3GPP Release 15).

Aspects of the disclosure are initially described in the context of wireless communications systems. Additional aspects are described with reference to UE configurations and a process flow. Aspects of the disclosure are further illustrated by and described with reference to apparatus diagrams, system diagrams, and flowcharts that relate to control channel limitations for enhanced low latency processing.

FIG. 1 illustrates an example of a wireless communications system 100 that supports control channel limitations for enhanced low latency processing in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a base station 105 may configure a search space set for transmission of DCI to a UE 115. The search space set may include a number of PDCCH blind decoding candidates at multiple ALs. In some cases, the base station 105 may configure multiple search space sets for transmission of DCI to the UE 115 within a single CORESET. Additionally, the base station 105 may configure multiple CORESETs within a same slot for the UE 115. While search space sets for a same CORESET may not overlap in time, search space sets for different CORESETs may partially or fully overlap for one or more symbols in a slot. A high number of blind decoding candidates or resources for channel estimation may increase decoding complexity and processing latency at the UE 115. If these candidates or resources are concentrated in overlapping search space sets for different CORESETs, a UE 115 configured for low latency processing may be unable to process the configured PDCCH candidates and CCEs within the allocated timeframe.

To handle the overlapping PDCCH occasions for different CORESETs, a base station 105, a UE 115, or both may implement different thresholds according to one or more configurations. For example, in a first configuration, a wireless device may implement slot-based thresholds. The slot-based thresholds may indicate a maximum number of PDCCH candidates, non-overlapping CCEs, or both for a slot. However, this configuration may not identify high densities of PDCCH candidates or CCEs within a symbol or monitoring occasion within a slot. To handle such scenarios, the wireless device may implement symbol-based or occasion-based thresholds. For example, a symbol-based threshold may specify a maximum number of CCEs for channel estimation within a symbol or a set of symbols. An occasion-based threshold may specify a maximum number of PDDCH candidates to attempt to blind decode within a monitoring occasion. These thresholds may identify high densities of blind decoding candidates, CCEs, or both across CORESETs within specific symbol periods of a slot.

In some cases, the network may apply these thresholds. For example, a base station 105 may configure a UE 115 with CORESETs such that the PDCCH candidates and CCEs for the CORESET configuration do not exceed the thresholds. In other cases, the base station 105 may generate a configuration such that the configuration exceeds one or more of the thresholds. In these cases, a UE 115 may check the thresholds based on the configurations. If the UE 115 identifies a number of PDCCH candidates or a number of CCEs exceeding one of the occasion-based or symbol-based thresholds, the UE 115 may modify a process of the UE 115. For example, the UE 115 may refrain from monitoring certain candidates or estimating certain frequency resources to reduce the processing latency and get the numbers of candidates and CCEs below the thresholds. In another example, the UE 115 may fallback from an enhanced URLLC processing timeline to a more relaxed processing timeline (e.g., an eMBB processing timeline) to handle the large number of PDCCH candidates in a monitoring occasion or the large number of CCEs for channel estimation in a symbol.

Figure 2:
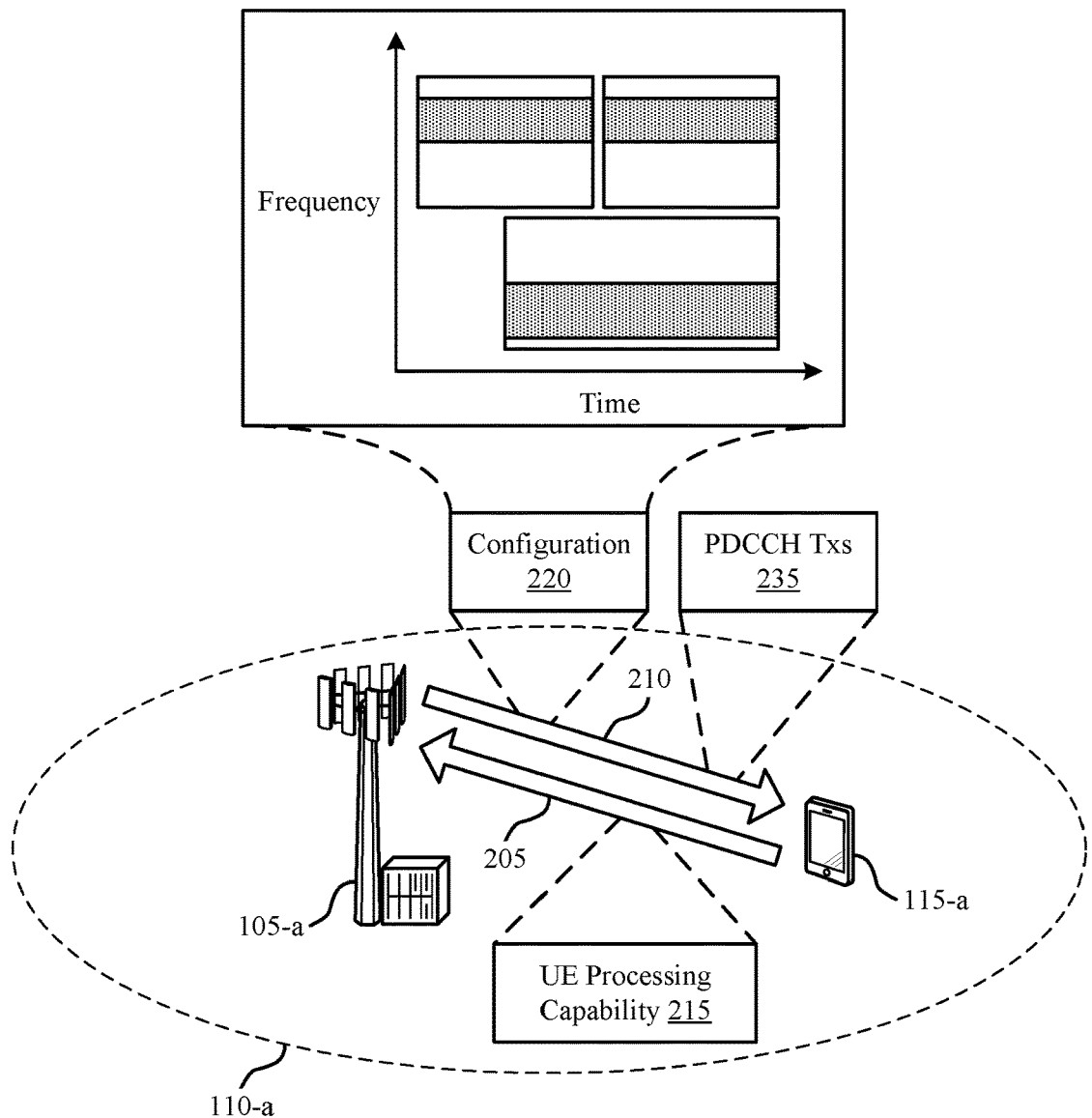

FIG. 2 illustrates an example of a wireless communications system 200 that supports control channel limitations for enhanced low latency processing in accordance with aspects of the present disclosure. The wireless communications system 200 may include base station 105-a and UE 115-a, which may be examples of the corresponding devices described with reference to FIG. 1. Base station 105-a may provide network coverage for a geographic coverage area 110-a. In some cases, the wireless communications system 200 (e.g., an NR system) may support control channel enhancements for URLLC. For example, a first group of UEs 115 (e.g., URLLC UEs 115) supported by base station 105-a may operate according to low latency processing timelines while a second group of UEs 115 (e.g., eMBB UEs 115) supported by base station 105-a may operate according to more relaxed processing timelines, for example, due to capabilities of the UEs 115. In some cases, base station 105-a, UE 115-a, or both may implement control channel limits to support enhanced low latency processing or to modify processing timelines.

UE 115-a may be an example of an enhanced URLLC-capable UE 115. Accordingly, UE 115-a may operate according to or may support reduced processing timelines for HARQ reporting, PUSCH preparation, CSI computation, or some combination of these. In some cases, UE 115-a may indicate one or more of these UE processing capabilities 215 to base station 105-a (e.g., via an uplink channel 205). Base station 105-a may then configure UE 115-a according to the indicated UE processing capabilities 215. For example, base station 105-a may configure UE 115-a to communicate with a reduced $N_1$ value, a reduced $N_2$ value, a reduced Z value, a reduced Z' value, or a combination thereof as compared with a UE 115 operating according to existing or legacy processing timelines (e.g., eMBB processing timelines specified in 3GPP Release 15 for NR). That is, a timing offset between the end of a physical downlink shared channel (PDSCH) transmission and the start of the corresponding HARQ transmission on the physical uplink control channel (PUCCH), $N_1$, may be reduced, a timing offset between the end of a PDCCH transmission and the start of a corresponding PUSCH transmission, $N_2$, may be reduced, a timing offset between the end of a PDCCH transmission and the start of a transmission of a CSI report, Z, may be reduced, a timing offset between the end of a CSI reference signal (CSI-RS) resource and the start of a PUSCH transmission carrying uplink control information (UCI), Z', may be reduced, or any combination of these processing timelines may be reduced. Such reductions in processing times may significantly reduce latency in the wireless communications system 200.

To support one or more of these low latency processing timelines, base station 105-a, UE 115-a, or both may limit the number of CCEs for UE 115-a to perform channel estimation on and the number of blind decoding processes for UE 115-a to perform when attempting to detect and decode a PDCCH transmission 235 from base station 105-a (e.g., on the downlink channel 210). Limiting these values may support fast blind decoding of the PDCCH transmissions 235. In some cases, these limits may be applied per slot. For example, for a subcarrier spacing (SCS) of 30 kilohertz (KHz), UE 115-a may perform channel estimation for a maximum of 56 non-overlapping CCEs in a single slot. The limit on blind decoding attempts may similarly be specified for the slot (e.g., based on the given SCS).

For enhanced URLLC operation, UE 115-a may monitor for PDCCH transmissions in multiple monitoring occasions within a slot to reduce the scheduling delay for control information. However, if base station 105-a, UE 115-a, or both apply CCE and/or blind decoding limits per slot, as opposed to per monitoring occasion, base station 105-a may configure the maximum number of non-overlapping CCEs, blind decoding candidates, or both in a subset of overlapping monitoring occasions (i.e., monitoring occasions for search space sets in different CORESETs that overlap in time resources). Based on the density of these CCEs, blind decoding candidates, or both, UE 115-a may not be able to process the CCEs, blind decoding candidates, or both according to the fast processing timeline for URLLC. As such, base station 105-*a*, UE 115-*a*, or both may apply non-overlapping CCE limits, blind decoding limits, or both per symbol or per set of overlapping monitoring occasions instead of or in addition to the per slot limitations.

UE 115-*a* may be configured with one or more CORESETs 225 for receiving control information (e.g., DCI in PDCCH transmissions 235). Each CORESET 225 may be associated with one or more search space sets 230. In some cases, base station 105-*a* may transmit a configuration 220 to UE 115-*a* to configure the CORESETs 225 and search space sets 230 for UE 115-*a*. This configuration 220 may be based on the UE processing capabilities 215 of UE 115-*a*. In other cases, UE 115-*a* may be pre-configured with the configuration 220. In some examples, UE 115-*a* may be configured with up to three CORESETs 225 per bandwidth part (BWP). Each CORESET 225 may specify frequency resources (e.g., specific RBs) and a time span (e.g., a number of OFDM symbols, such as 1, 2, or 3 symbols) for the CORESET 225. Additionally, each CORESET 225 may be configured with either a narrowband demodulation reference signal (DMRS) (e.g., where the DMRSs are within the CCEs used for PDCCH candidates) or a wideband DMRS (e.g., where the DMRSs are over each entire CORESET cluster that contains CCEs used for PDCCH candidates).

Each CORESET 225 is associated with one or more search space sets 230. For example, for each BWP, UE 115-*a* may be configured with up to 10 search space sets 230. Each search space set 230 may be configured with a corresponding radio network temporary identifier (RNTI), DCI format, AL, type of search space (e.g., a common search space (CSS) or UE-specific search space (DESS)), periodicity, slot offset within the periodicity, bit sequence for monitoring (e.g., a 14-bit sequence indicating the symbols over which the search space set 230 is present), or some combination of these parameters. In some cases, the DCI format may specify whether the search space set corresponds to control information for fast processing (e.g., according to an enhanced URLLC processing timeline) or relaxed processing. In one specific example, UE 115-*a* may be configured with CORESET #X spanning two OFDM symbols. A search space set #Y associated with CORESET #X may be configured to be monitored over symbols 2-3,5-6, and 9-10 by UE 115-*a*, where each monitoring occasion has two symbols. These same monitoring occasions may be configured for UE 115-*a* for search space set #Y every Z slots, where Z is the search space set periodicity.

For a single CORESET 225, monitoring occasions for different search space sets 230 may not overlap (e.g., fully or partially) in time resources. However, search space sets 230 for different CORESETs 225 may fully or partially overlap in time. For example, a first CORESET 225 may have a first search space set 230 with a monitoring occasion spanning symbols 1 and 2. A second search space set 230 for this first CORESET 225 may have a monitoring occasion spanning non-overlapping symbols 3 and 4. However, a second CORESET 225 may have a search space set 230 with a monitoring occasion spanning symbols 2, 3, and 4, partially overlapping with the search space sets 230 for the first CORESET 225. In such cases, if UE 115-*a* is configured with the three search space sets 230 for the two CORESETs 225, UE 115-*a* may attempt to process CCEs and decoding candidates for the sum of the monitoring occasions between the different CORESETs 225. As the search space sets 230 of different CORESETs 225 may overlap in time (e.g., in one or more OFDM symbols or symbol periods) in one or more slots (e.g., based on the search space set periodicities), UE 115-*a* may implement one or more techniques for handling this high density of CCEs and/or decoding candidates within the same symbols or monitoring occasions.

In conventional systems implementing longer processing timelines (e.g., eMBB systems), base stations, UEs, or both may apply overbooking rules. For example, the network may configure CSSs for UEs such that a per slot total blind decode limit, a per slot total CCE limit, or both is not exceeded by the CSSs. A UE may monitor the CSSs and may monitor a subset of UESSs based on the total blind decode limit for the slot, the total CCE limit for the slot, or both. For example, the UE may start monitoring the lowest indexed UESS and consume the blind decoding candidates and non-overlapping CCEs for this UESS. The UE may progressively monitor the UESSs from the lowest index to the highest index until one of the limits is reached (e.g., the total blind decode limit or the total CCE limit for the slot). The UE may halt monitoring once a limit is reached and may refrain from monitoring the remaining search space sets (e.g., with the highest indexes). While applying limits for the slot may support longer processing timelines, these limits may not allow for shorter processing timelines in systems supporting low latency operations. For example, if a processing timeline requires detection, decoding, and processing of control information within a number of symbols, as opposed to one or more slots, slot-based limits may not ensure that the UE is capable of performing the appropriate channel estimation procedures and blind decoding attempts within the specified processing timelines.

In contrast, wireless communications system 200 may support symbol-based limits, monitoring occasion-based limits, or both for non-overlapping CCEs and decoding candidates. These limits may support enhanced URLLC processing timelines for UE 115-*a*. The wireless communications system 200 may implement these symbol/occasion-based limits in addition to or instead of slot-based limits. For example, the wireless devices may apply a limit on the overlapping monitoring occasions of different CORESETs 225. As each symbol of PDCCH transmissions 235 contains DMRSs, the wireless devices may additionally or alternatively apply a limit on the number of CCEs per OFDM symbol when monitoring occasions associated with different CORESETs 225 overlap, as UE 115-*a* may perform channel estimation for each of these CCEs using the DMRSs.

In a first example, base station 105-*a*, UE 115-*a*, or both may implement a frequency limit (e.g., a threshold value indicating a maximum number of RBs, resource element groups (REGs), etc.) per symbol for overlapping search space sets 230 of different CORESETs 225. In particular, to support an enhanced timing capability at UE 115-*a*, the configuration 220 may ensure that when monitoring occasions of search space sets 230 associated with different CORESETs 225 overlap in time, this frequency limit is not exceeded for any symbol. In some cases, in addition to or alternative to the frequency threshold (e.g., a threshold number of REGs or RBs on each symbol), the wireless devices may implement a threshold number of CCEs, a threshold number of DMRSs for channel estimation, or both. Base station 105-*a* may enforce this limit when configuring UE 115-*a* for control channel monitoring.

In a second example, base station 105-*a*, UE 115-*a*, or both may implement a decoding candidate limit (e.g., a threshold value indicating a maximum number of blind decoding attempts) for overlapping monitoring occasions of search space sets 230 of different CORESETs 225. As blind decoding is performed per monitoring occasion (as opposed to per symbol), the wireless devices may limit the sum of blind decoding candidates across overlapping monitoring occasions, rather than for a single symbol. Similar to the non-overlapping CCE limit per symbol, base station 105-*a* may enforce this blind decoding limit when configuring UE 115-*a* for control channel monitoring.

In one specific example, base station 105-*a* may configure CORESETs 225 for UE 115-*a* such that the search space sets 230 for the different CORESETs 225 do not have overlapping monitoring occasions. As such, both the CCE and blind decoding limits may be defined per monitoring occasion. For example, as each symbol has a single monitoring occasion, a per symbol limit would be redundant to the monitoring occasion limits. However, in other examples, base station 105-*a* may configure CORESETs 225 for UE 115-*a* such that the search space sets 230 for the different CORESETs 225 have overlapping monitoring occasions for increased scheduling flexibility.

In some cases, base station 105-*a*, UE 115-*a*, or both may perform a segmentation procedure to determine a number of non-overlapping CCEs, a number of blind decodes, or both per symbol. The segmentation procedure may involve first dividing the number of blind decoding attempts, the number of non-overlapping CCEs, or the number of REGs forming the UE's search space by the number of symbols for each search space occasion and summing up the per symbol per occasion number of blind decoding attempts, CCEs, or REGs from all partially or fully overlapping monitoring occasions. For example, monitoring occasions for a first CORESET 225 in symbols 1 and 2 and in symbols 3 and 4 may overlap with a monitoring occasion for a second CORESET 225 in symbols 2, 3, and 4. Monitoring occasion A may include 6 blind decoding candidates (e.g., in symbols 1 and 2), monitoring occasion B may include 4 blind decoding candidates (e.g., in symbols 3 and 4), and monitoring occasion C may include 3 blind decoding candidates (e.g., in symbols 2, 3, and 4). Based on this configuration 220 and the segmentation approach, symbol 1 may include 6/2=3 blind decoding attempts, symbol 2 may include 6/2+3/3=4 blind decoding attempts, and symbols 3 and 4 may include 4/2+3/3=3 blind decoding attempts. If base station 105-*a*, UE 115-*a*, or both implement a blind decoding limit per symbol, these calculated values for each symbol may be compared to the per symbol limit. In some cases, the base station 105-*a* may configure the UE 115-*a* such that none of these values exceed the blind decoding limit per symbol. In other cases, if UE 115-*a* identifies one of these values exceeding the blind decoding limit, UE 115-*a* may perform one or more operations for handling this high density of blind decoding attempts (e.g., dropping attempts or falling back to a longer processing timeline). Similar approaches may be performed for a CCE limit, an REG limit, or both.

In some cases, the blind decoding limit, CCE limit, REG limit, or some combination thereof may be applied for any number of symbols (e.g., in addition to or instead of per symbol). For example, base station 105-*a*, UE 115-*a*, or both may apply one or more of these limits for sets of 2 symbols or 7 symbols. In some cases, the wireless devices may apply multiple limits for different symbol spans. For example, the wireless devices may perform a segmentation of 4+4+4+2 symbols with 4 symbol and 2 symbol limits in a slot, a segmentation of 5+5+4 symbols with 5 symbol and 4 symbol limits, etc.

The wireless devices may implement the symbol/occasion-based limits per active BWP of a component carrier, per component carrier, per group of component carriers (e.g., the component carriers in a same PUCCH group), or across all component carriers. For example, if the wireless devices implement CCE limits over each component carrier of a PUCCH group, the devices may sum non-overlapping CCEs for a symbol in overlapping monitoring occasions across active BWPs in different component carriers of the PUCCH group. If implementing limits across all component carriers, a wireless device may sum CCEs, blind decoding candidates, REGs, etc. over the subset of component carriers sharing a same PDCCH numerology. In some cases, the limits may be SCS dependent. For example, different SCSs may have different maximum numbers of CCEs per symbol, maximum numbers of blind decoding candidates for overlapping monitoring occasions, or some combination thereof.

In some cases, UE 115-*a* may be configured with CORESETs 225 associated with different processing timelines. In these cases, if UE 115-*a* receives a PDCCH transmission 235 in a CORESET 225 for enhanced URLLC, UE 115-*a* may process the PDCCH according to a low latency timeline. However, if UE 115-*a* receives a PDCCH transmission 235 in a CORESET 225 for eMBB, UE 115-*a* may process the PDCCH according to a relaxed timeline (e.g., a longer timeline than the low latency timeline). This processing timeline may correspond to HARQ timing, PUSCH timing, CSI timing, or some combination of these. For example, the configuration 220 for UE 115-*a* may contain a total set of CORESETs 225 including a first subset of eMBB CORESETs 225 and a second subset of enhanced URLLC CORESETs 225. The wireless devices may apply a blind decoding/CCE limit for a slot using the total set of CORESETs 225. However, for blind decoding/CCE limits per monitoring occasion or per symbol, the wireless devices may apply the limits using the total set of CORESETs 225 or using the second subset of enhanced URLLC CORESETs 225. As such, the symbol/occasion-based limits may be defined over the CORESETs 225 for which the timing are based on fast processing timeline or may be defined over all configured CORESETs 225 in the configuration 220.

In a first implementation, the network may enforce the symbol/occasion-based limits. For example, the limits may be determined (e.g., based on a pre-configuration or dynamically determined based on the UE processing capabilities 215) by base station 105-*a*. Base station 105-*a* may configure UE 115-*a* such that the symbol/occasion-based limits are not violated by the configuration 220. In this implementation, UE 115-*a* may or may not be aware of the symbol/occasion-based limits. Due to the applied limits, an enhanced URLLC UE 115-*a* may process the PDCCH transmissions 235 according to a low latency timeline.

In a second implementation, the network may not enforce the symbol/occasion-based limits. For example, in some cases, base station 105-*a* may configure UE 115-*a* with more non-overlapping CCEs, blind decoding candidates, or both than the specified symbol/occasion-based limits. In this implementation, base station 105-*a* may or may not be aware of the symbol/occasion-based limits. UE 115-*a* may determine whether the configuration 220 violates at least one of the symbol/occasion-based limits (e.g., the blind decoding limit, the CCE limit, or both). If the configuration 220 does not exceed one of the symbol/occasion-based limits, URLLC UE 115-*a* may process the PDCCH transmissions 235 according to a low latency timeline. However, if the configuration 220 includes more non-overlapping CCEs, blind decoding candidates, or both than the specified symbol/occasion-based limits, URLLC UE 115-*a* may process the PDCCH transmissions 235 according to a slower timing (e.g., an eMBB processing timeline). In other cases, if the configuration 220 includes more non-overlapping CCEs, blind decoding candidates, or both than the specified symbol/occasion-based limits, URLLC UE 115-*a* may refrain from performing channel estimation or blind decoding for a number of CCEs or PDCCH decoding candidates to enforce the limits at UE 115-*a* (e.g., even if the limits are not enforced in the configuration 220).

Based on either the first implementation or the second implementation, the wireless communications system 200 may support configuring UE 115-*a* with multiple CORESETs 225 with overlapping monitoring occasions. Despite these overlapping monitoring occasions, UE 115-*a* may operate according to an appropriate processing timeline based on the density of CCEs for channel estimation, the density of blind decoding candidates in a monitoring occasion, or both. This may allow UE 115-*a* to support low latency processing timelines for HARQ transmission, PUSCH transmission, CSI reporting, or some combination of these when the configuration 220 complies with the symbol/occasion-based limits, and UE 115-*a* may support reliable processing and transmission of HARQ/PUSCH/CSI if the configuration 220 violates the symbol/occasion-based limits.

Figure 3:
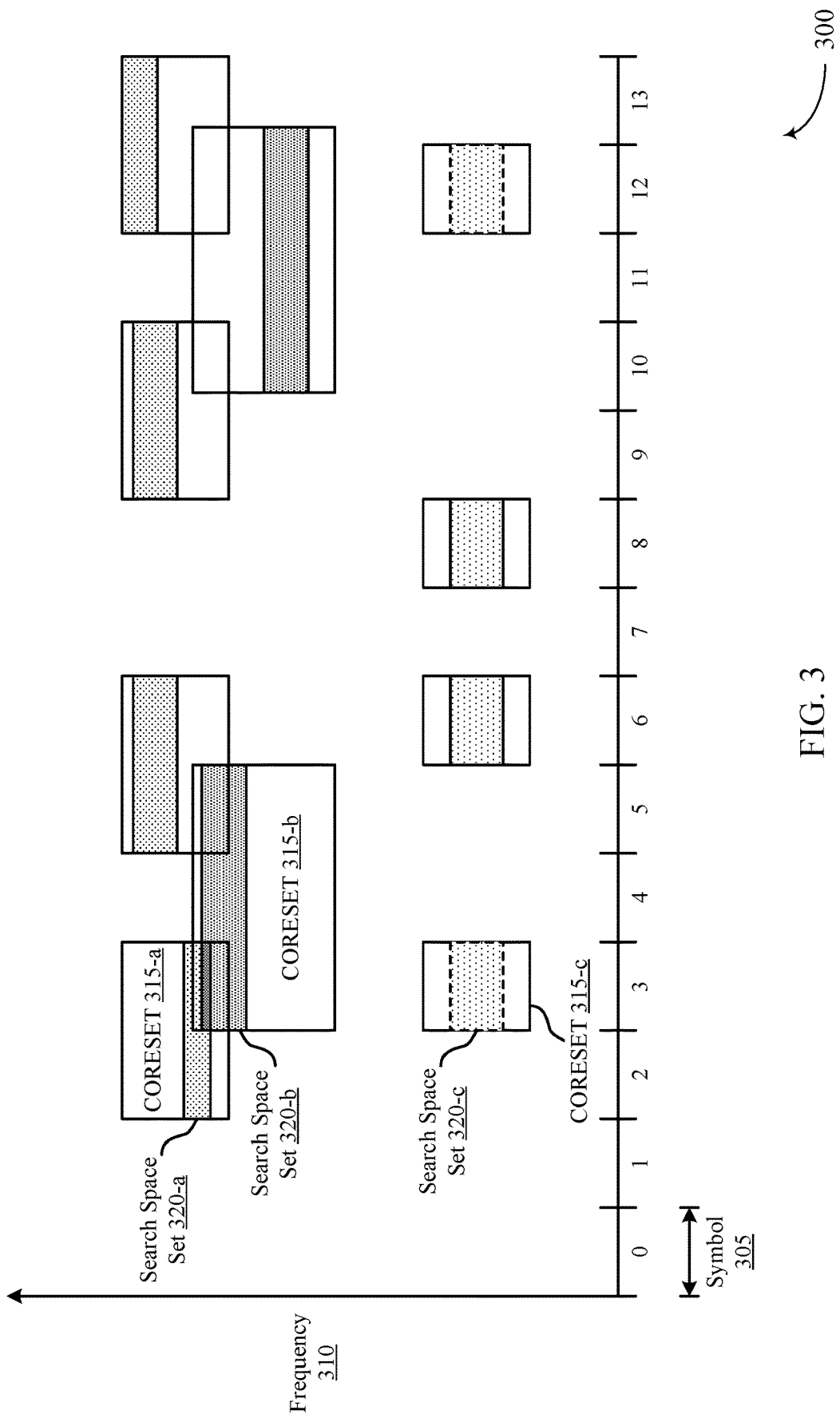
FIG. 3 illustrates an example of a user equipment (UE) configuration for control channel monitoring that supports control channel limitations for enhanced low latency processing in accordance with aspects of the present disclosure.

FIG. 3 illustrates an example of a UE configuration 300 for control channel monitoring that supports control channel limitations for enhanced low latency processing in accordance with aspects of the present disclosure. The UE configuration 300 may be implemented by a UE 115, as described with reference to FIGS. 1 and 2, if the UE 115 identifies that a CORESET configuration exceeds a symbol-based or monitoring occasion-based CCE or blind decoding candidate limit. In the UE configuration 300, the UE 115 may not consume the additional CCEs or blind decoding candidates beyond the specified threshold values.

A UE 115 may be configured with multiple CORESETs 315 within a slot, where the slot spans a number of symbols 305 (e.g., 14 OFDM symbols). Each CORESET 315 may correspond to a frequency 310 range (e.g., either contiguous or non-contiguous) and a time span. For example, CORESET 315-*a* may correspond to a first frequency range and may span two symbols 305, CORESET 315-*b* may correspond to a second frequency range and may span three symbols 305, and CORESET 315-*c* may correspond to a third frequency range and may span one symbol 305. The UE 115 may be configured with a number of search space sets 320, where each search space set 320 is associated with one of these CORESETs 315. The UE 115 may perform blind detection in the monitoring occasions corresponding to each of these search space sets 320. No search space sets 320 for a same CORESET 315 may overlap in time, but search space sets 320 for different CORESETs 315 may overlap in time. For example, search space sets 320-*a*, 320-*b*, and 320-*c* may overlap in symbol 3 of the slot.

In this case, if the UE 115 is configured for URLLC operation—or, more generally, if the UE 115 is configured with timings (e.g., $N_1$, $N_2$, Z, Z') shorter than those specified in 3GPP Release 15 for NR—the UE 115 may not be able process the non-overlapping CCEs, the blind decoding PDCCH candidates, or both in symbol 3 and follow an enhanced URLLC timeline. For example, the processing at the UE 115 to perform channel estimation for the CCEs or perform blind decoding for the PDCCH candidates in search space sets 320-*a*, 320-*b*, and 320-*c* may exceed the processing capabilities of the UE 115 within a low latency timeline. In order to maintain this low latency timeline, the UE 115 may perform CCE or decoding candidate pruning to reduce the processing overhead at the UE 115, allowing the UE 115 to perform the reduced amount of processing according to the low latency timeline.

For example, the UE 115 may apply symbol-based or monitoring occasion-based limit across all of the CORESETs 315. In a first example, the UE 115 may determine the total number of non-overlapping CCEs to perform channel estimate for within symbol 3. As illustrated, search space set 320-*a* and search space set 320-*b* may overlap in frequency. The UE 115 may perform channel estimation once for any CCEs that are included in both search space set 320-*a* and search space set 320-*b*. As such, the UE 115 may calculate the total number of non-overlapping CCEs so that each of these CCEs overlapping between search space set 320-*a* and search space set 320-*b* are counted only once. The UE 115 may compare the determined number of non-overlapping CCEs within symbol 3 to a symbol-based limit for non-overlapping CCEs. In a second example, the UE 115 may determine the total number of PDCCH candidates for blind decoding in overlapping monitoring occasions. For example, the monitoring occasions for search space sets 320-*a*, 320-*b*, and 320-*c* all overlap (e.g., in symbol 3). The UE 115 may compare the total number of blind decoding candidates for the overlapping monitoring occasions to a monitoring occasion-based limit for blind decoding.

If either limit is exceeded by the CORESET configuration, the UE 115 may refrain from consuming the additional CCEs, decoding candidates, or both. For example, the UE 115 may implement one or more overbooking rules to handle the excessive resources. If the limits are calculated across all of the CORESETs 315, the UE 115 may identify any CSSs within the overlapping symbol 305 or monitoring occasion and may perform channel estimation and blind decoding for the CSSs. The UE 115 may then perform channel estimation and blind decoding for the UESSs (e.g., based on the UESS indexes) until one of the limits is reached. For example, the UE 115 may start with the UESS in the overlapping portion with the lowest UESS index and may progress towards higher UESS indexes until one of the limits is reached. Once a limit is reached, the UE 115 may not perform channel estimation or blind decoding for the remaining CCEs or decoding candidates.

If the limits are calculated across the URLLC CORESETs 315 (e.g., CORESETs 315 where if DCI is detected within the associated search space set 320 the UE 115 uses HARQ/PUSCH/CSI timings according to a low latency processing timeline), the UE 115 may start with monitoring UESSs rather than CSSs, as CSSs may not be relevant for enhanced URLLC operation. For example, the UE 115 may identify the UESSs present in the overlapping portions and may perform channel estimation and blind decoding for the UESSs according to a certain order until one of the limits is reached. The UE 115 may refrain from performing additional channel estimation or blind decoding for the remaining CCEs or decoding candidates after the limit is reached. In this way, the UE 115 may reduce the processing overhead to an amount that is manageable by the UE 115 during the low latency processing timeline.

Additionally or alternatively, an overbooking rule for the UE 115 may ensure fair monitoring between CORESETs 315. In some cases, a base station 105 may use multiple TRPs to serve the UE 115. In these cases, each CORESET 315 may be associated with one TRP of the set of TRPs (e.g., based on an explicit identifier (ID) or implicitly based on a quasi-co-location (QCL) assumption). If the UE 115 determines to use an overbooking rule (e.g., based on a symbol-based or monitoring occasion-based limit), the UE 115 may determine if the CORESETs 315 are associated with different TRPs, different QCL assumptions, or both and may implement distributed monitoring across CORESETs 315 for different TRPs to monitor for each of TRP in the set of TRPs. For example, if the overlapping monitoring occasions for the search space sets 320 are associated with CORESETs 315 corresponding to different TRPs, the UE 115 may monitor for a candidate from a first CORESET 315-a, then from a second CORESET 315-b, then a third CORESET 315-c, then the first CORESET 315-a again, etc. This fair sharing of monitoring between CORESETs 315 may be used instead of or in combination with index-based search space set 320 monitoring (e.g., the order of the CORESET 315 sequence for fair monitoring may be initially based on the search space set 320 indexes).

As illustrated, a UE 115 may identify temporally overlapping search space sets 320-a, 320-b, and 320-c within symbol 3, and may calculate the total number of non-overlapping CCEs for channel estimation within this symbol (e.g., using segmentation or another operation). The UE 115 may then compare the total number of CCEs across CORESETs 315-a, 315-b, and 315-c with a symbol-based non-overlapping CCE limit. If the calculated number of CCEs is less than or equal to the maximum number of CCEs specified by the symbol-based limit, the UE 115 may perform channel estimation for all of the CCEs within these overlapping search space sets 320 according to an enhanced URLLC timeline. In contrast, if the calculated number of CCEs is greater than the maximum number of CCEs specified by the symbol-based limit, the UE 115 may drop one or more CCEs. For example, the UE 115 may determine that CORESET 315-a is CSS, and may perform channel estimation for the CCEs in CORESET 315-a for symbol 3. The UE 115 may determine that CORESETs 315-b and 315-c are UESSs, where CORESET 315-b has a lower search space index than CORESET 315-c. Accordingly, the UE 115 may perform channel estimation for the non-overlapping CCEs in CORESET 315-b for symbol 3 next. If the symbol-based limit for CCEs has not yet been exceeded, the UE 115 may perform channel estimation for the non-overlapping CCEs in CORESET 315-c until the UE 115 reaches the limit. At this point, the UE 115 may refrain from performing channel estimation for the remaining CCEs allocated in CORESET 315-c to support the UE 115 maintaining the URLLC processing timeline.

Figure 4:
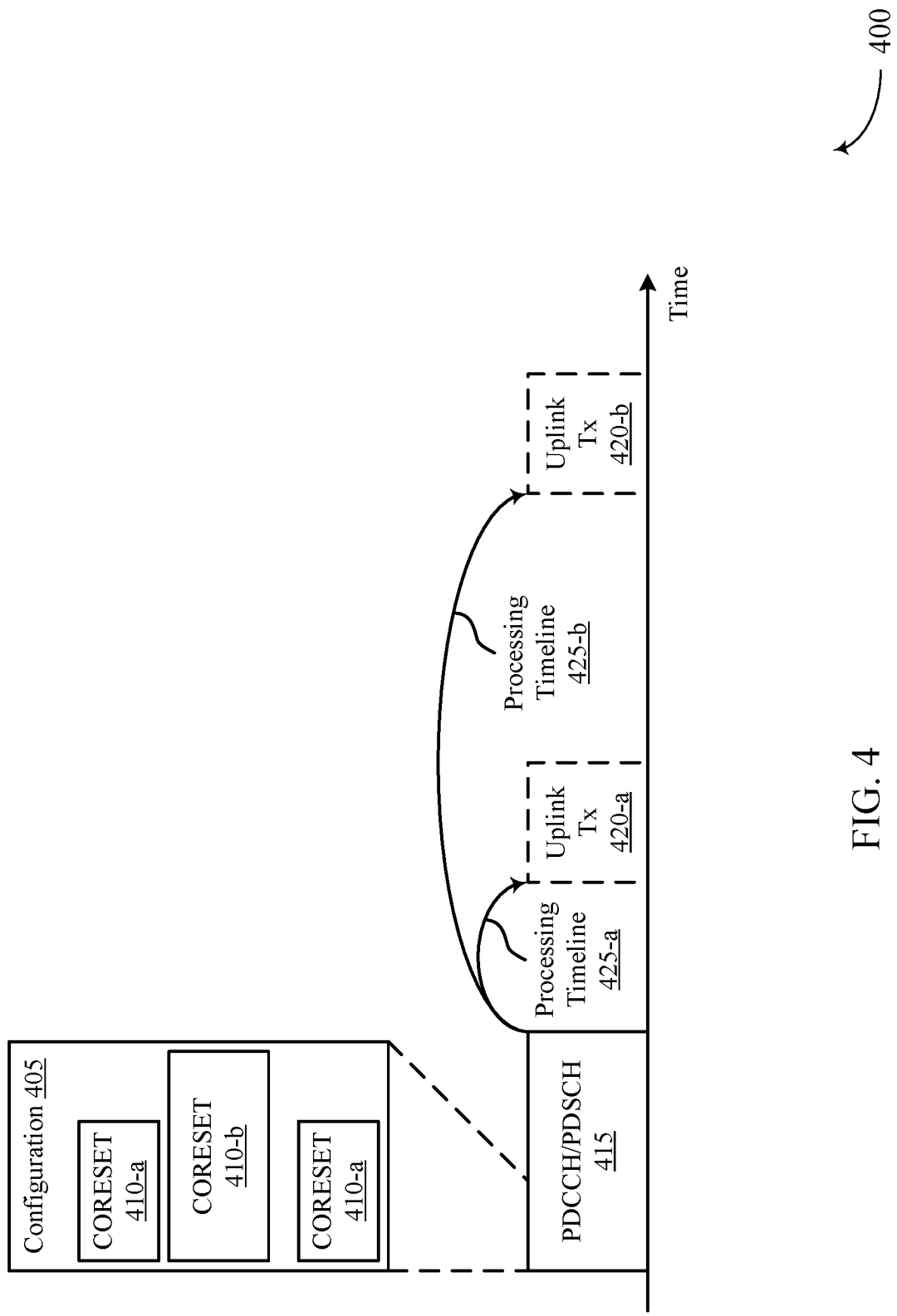
FIG. 4 illustrates an example of a UE configuration for control channel processing that supports control channel limitations for enhanced low latency processing in accordance with aspects of the present disclosure.

FIG. 4 illustrates an example of a UE configuration 400 for control channel processing that supports control channel limitations for enhanced low latency processing in accordance with aspects of the present disclosure. The UE configuration 400 may be implemented by a UE 115, as described with reference to FIGS. 1 and 3, if the UE 115 identifies that a CORESET configuration exceeds a symbol-based or monitoring occasion-based CCE or blind decoding candidate limit. In the UE configuration 400, the UE 115 may adjust one or more processing timelines 425 to support a large processing overhead based on a high density of CCEs for channel estimation, PDCCH candidates for blind decoding, or both.

The UE 115 may monitor for a PDCCH transmission 415 according to a configuration 405. The configuration 405 may include multiple CORESETs 410 for the UE 115. In some cases, search space sets for the different CORESETs 410 may overlap in one or more symbols within a slot. In these cases, the UE 115 may determine whether a symbol-based or monitoring occasion-based CCE or blind decoding candidate limit is exceeded by the configuration 405.

A base station 105 transmitting the PDCCH transmission 415 may implement wideband reference signals (WBRSs) or narrowband reference signals for the control channel. In the case of WBRSs, the base station 105 may transmit reference signals over an entire CORESET 410 or a cluster of a CORESET 410 that contains the CCEs of the PDCCH. For example, the frequency resources for CORESET 410-a may be non-contiguous. Each contiguous set of RBs for CORESET 410-a may be referred to as a cluster. The base station 105 may transmit WBRSs over the cluster of CORESET 410-a that contains the search space set for the UE 115 in that set of symbols and may not transmit WBRSs over the other cluster(s). In this way, for WBRS implementations, the UE 115 may perform channel estimation for the CCEs within the cluster containing the reference signals and may not perform channel estimation for the other cluster(s). As the RBs for CORESET 410-b are contiguous, the base station 105 may transmit the wideband DMRSs over the entire CORESET 410-b. Due to the WBRSs over all the CCEs and REGs within a CORESET 410 or cluster, the per-symbol CCE limit for a UE 115 may be defined over all of the CCEs and REGs where the WBRSs are present, rather than just over the CCEs corresponding to configured decoding candidates. The base station 105, the UE 115, or both may determine the CCE limit, a blind decoding limit, or both as a function of the number of monitoring occasions (e.g., the number of monitoring occasions of search space sets of each specific CORESET 410 or the total number of monitoring occasions over all search space sets of all CORESETs 410) within a slot.

If the UE 115 determines that CCE limit per symbol or blind decoding limit per monitoring occasion is exceeded by the configuration 405, the UE 115 may fallback to a longer processing timeline 425. For example, a UE 115 operating according to an enhanced URLLC process may perform an uplink transmission 420-a according to a first processing timeline 425-a. This processing timeline 425-a and uplink transmission 420-a may correspond to PDSCH processing (e.g., if the PDCCH transmission 415 is followed by a PDSCH transmission) and an uplink HARQ transmission, PDCCH processing and an uplink PUCCH transmission, PDCCH processing and an uplink CSI reporting transmission, or some combination of these. If the configuration 405 does not exceed the symbol/occasion-based limits, the UE 115 may operate according to the first processing timeline 425-a for reduced latency. However, if the configuration 405 exceeds the symbol/occasion-based limits, the UE 115 may fall back to the second processing timeline 425-b (e.g., an eMBB processing timeline). This second processing timeline 425-b may allow the UE 115 to process a larger processing overhead (e.g., at the expense of the latency), and the UE 115 may transmit an uplink transmission 420-b according to this longer processing timeline 425-b.

In some specific cases, the UE 115 may perform a combination of pruning and falling back on a longer timeline. For example, the UE 115 may initially perform pruning of CCEs or decoding candidates up to a pruning threshold number. If the UE 115 reaches the pruning threshold number, and the remaining CCEs or decoding candidates still exceed the limits, the UE 115 may then fallback on a longer processing timeline 425-b. In some cases, the UE 115 may reintroduce the pruned CCEs or candidates upon falling back to this second processing timeline 425-b (e.g., as the UE 115 may now have enough processing time to handle the full processing overhead of the configuration 405).

In some cases, a UE 115 may fallback to a longer processing timeline 425-b based on other factors. For example, the UE 115 may fallback from processing timeline 425-a to processing timeline 425-b if the length of a CORESET 410 in time is longer than a threshold length, X. The length of the CORESET 410 in time may affect the processing speeds of PDCCH transmissions 415 at a UE 115. The CORESET 410 length threshold, X, may be pre-configured at the UE 115 and known by the network or may be a UE capability that can be reported to the network. If the UE 115 identifies a CORESET 410 in the configuration 405 that spans more than X symbols, the UE 115 may operate according to the processing timeline 425-b rather than the processing timeline 425-a. In some cases, a base station 105 may indicate the first processing timeline 425-a to the UE 115 implicitly or explicitly by a specific DCI format, a specific RNTI, etc. In these cases, if the UE 115 identifies a CORESET 410 longer than X, the UE 115 may not monitor for the specific DCI format or specific RNTI in search space sets for the identified CORESET 410.

Figure 5:
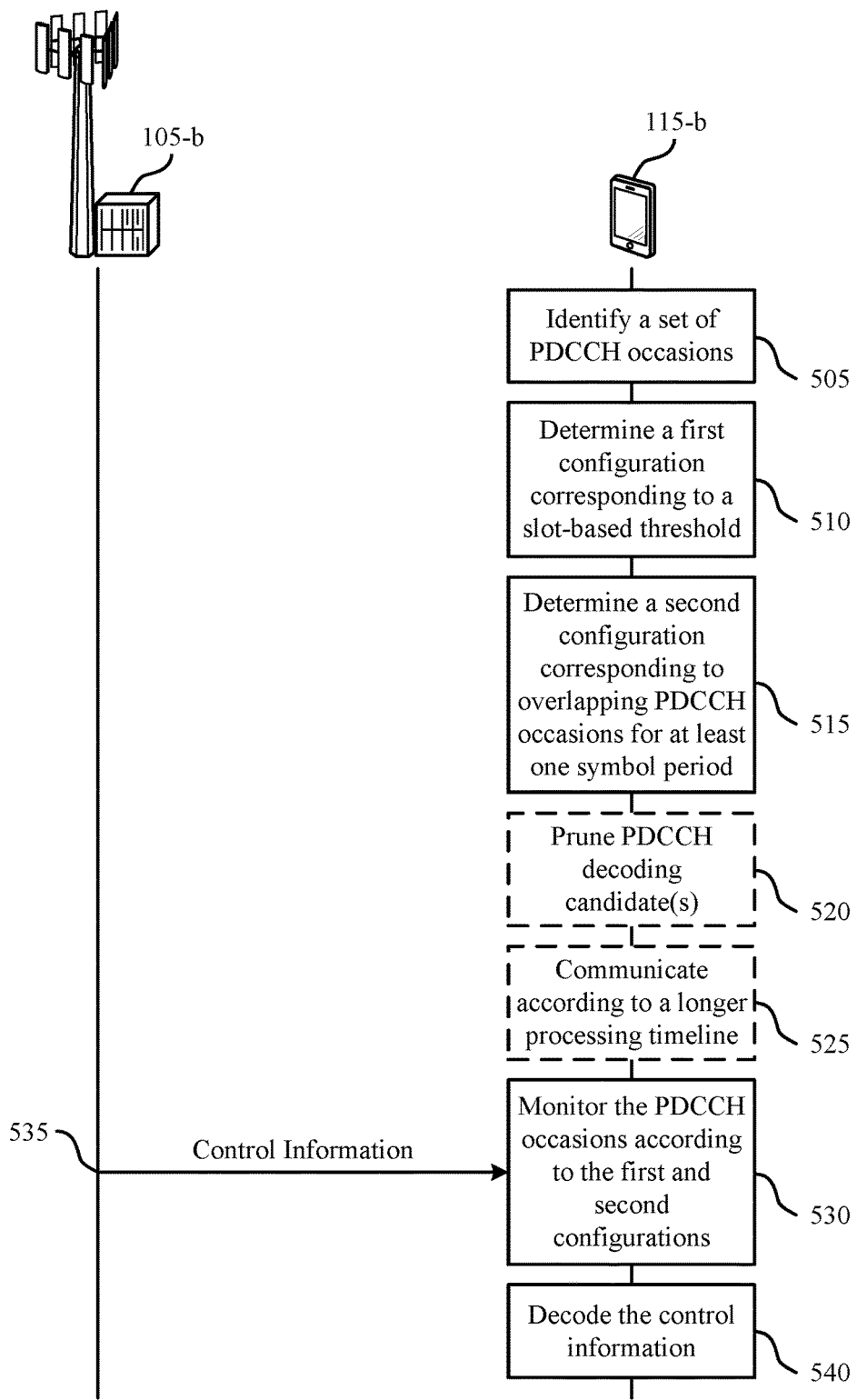
FIG. 5 illustrates an example of a process flow that supports control channel limitations for enhanced low latency processing in accordance with aspects of the present disclosure.

FIG. 5 illustrates an example of a process flow 500 that supports control channel limitations for enhanced low latency processing in accordance with aspects of the present disclosure. The process flow 500 may include base station 105-b and UE 115-b, which may be examples of the corresponding devices described with reference to FIGS. 1 through 4. Base station 105-b and UE 115-b may implement one or more techniques for implementing control channel limitations to support low latency processing timelines. Alternative examples of the following may be implemented, where some steps are performed in a different order than described or are not performed at all. In some cases, steps may include additional features not mentioned below, or further steps may be added.

At 505, UE 115-b may identify a set of PDCCH occasions for a slot. Each PDCCH occasion may be associated with a specific search space set of a particular CORESET. For example, UE 115-b may be configured with multiple CORESETs, and each CORESET may be associated with one or more search space sets. UE 115-b may monitor for DCI from base station 105-b within the configured search space sets for UE 115-b.

At 510, UE 115-b may determine a first configuration for monitoring the set of PDCCH occasions. The first configuration may include a threshold number of PDCCH candidates (e.g., blind decoding candidates), a threshold number of non-overlapping CCEs, a threshold number of REGs, or a combination thereof within a slot. These slot-based thresholds may ensure that the configuration for UE 115-b supports an eMBB processing timeline. In some cases, if UE 115-b identifies that a CORESET configuration exceeds one of these thresholds for the first configuration, UE 115-b may operate according to an overbooking rule. The overbooking rule may indicate PDCCH candidates or CCEs to drop to reduce the number of candidates or CCEs below the slot-based threshold.

At 515, UE 115-b may determine a second configuration for monitoring PDCCH occasions of the set of PDCCH occasions that overlap for at least one symbol period during the slot. The second configuration may include a threshold number of PDCCH candidates (e.g., blind decoding candidates) within the PDCCH occasions (e.g., monitoring occasions) that overlap for the at least one symbol period during the slot, a threshold number of non-overlapping CCEs for the at least one symbol period during the slot, a threshold number of frequency resources spanned by the PDCCH occasions within each symbol period of the at least one symbol period, a threshold number of frequency resources containing a reference signal (e.g., a WBRS transmitted in each CORESET or each CORESET cluster having one or more CCEs of the set of PDCCH occasions) associated with demodulating PDCCH candidates in the set of PDCCH occasions, or a combination thereof.

In some cases, UE 115-b may calculate a number of CCEs, a number of PDCCH candidates, a number of frequency resources, or some combination of these using a segmentation operation. For example, UE 115-b may determine a per symbol group metric for the PDCCH occasions based on a segmentation of a sum of PDCCH candidates or frequency resources (e.g., CCEs) across symbol groups of the at least one symbol period. These symbol groups may include a single symbol period or multiple symbol periods.

In some cases, one or more thresholds for the second configuration (e.g., the symbol-based or occasion-based limits) may be applied for each of a set of BWPs of a carrier (e.g., a component carrier), for each carrier of a group of carriers, or for an entire group of carriers. UE 115-b may determine a metric for the PDCCH occasions based on a sum of PDCCH candidates or frequency resources across carriers of a group of carriers sharing a numerology for the PDCCH occasions. Additionally or alternatively, one or more of the thresholds for the first configuration or the second configuration may be based on an SCS for the CORESETs. The thresholds may apply to each CORESET or a subset of CORESETs (e.g., based on a first protocol type of the CORESETs, such as URLLC CORESETs). The thresholds may further be based on a number of PDCCH occasions within the slot.

At 520, in some cases, UE 115-b may determine that a threshold of the second configuration is satisfied (e.g., a limit is exceeded) for the at least one symbol period. In these cases, UE 115-b may prune at least one PDCCH decoding candidate from at least one of the PDCCH occasions that overlap in a symbol period. UE 115-b may perform the pruning based on a priority of the search space sets. For example, the priority may be based on a protocol type associated with the PDCCH occasions that overlap for the at least one symbol, an index for the CORESETs or search space sets, or some combination of these priority parameters. In some cases, this pruning may involve pruning CCEs for the UE 115 to perform channel estimation for.

At 525, in some cases, UE 115-b may determine that a threshold of the second configuration is satisfied (e.g., a limit is exceeded) for the at least one symbol period. In these cases, UE 115-b may determine to communicate according to a longer processing timeline (e.g., an eMBB timeline) based on the exceeded threshold.

At 530, UE 115-b may monitor, in accordance with the first configuration and the second configuration, for control information (e.g., a PDCCH transmission containing DCI) during the set of PDCCH occasions. In some cases, UE 115-b may not monitor all of the configured PDCCH occasions based on the pruning at 520. At 535, base station 105-b may transmit control information to UE 115-b in one or more of the PDCCH occasions in the slot. Additionally or alternatively, UE 115-b may identify a DCI format or an RNTI associated with a first search space set associated with a first processing timeline and may suppress monitoring for the DCI format or RNTI based on determining that a length of the CORESET associated with the first PDCCH occasion satisfies (e.g., exceeds) a threshold.

At 540, UE 115-b may decode the control information identified within a first PDCCH occasion of the set of PDCCH occasions. In some cases, UE 115-b may identify that the first PDCCH occasion is associated with a first processing timeline (e.g., an enhanced URLLC timeline supporting faster processing and low latency). In some cases, UE 115-*b* may communicate with base station 105-*b* according to the first processing timeline. In other cases (e.g., if UE 115-*b* determined that a per-symbol or per-occasion threshold was exceeded at 525), UE 115-*b* may fallback to a second processing timeline (e.g., an eMBB timeline supporting greater processing overhead than the URLLC timeline). UE 115-*b* may communicate with base station 105-*b*, based on the control information, according to the second processing timeline due to determining that the threshold of the second configuration is satisfied (e.g., exceeded) for the at least one symbol period. Additionally or alternatively, UE 115-*b* may identify that the first PDCCH occasion is associated with the first processing timeline and may communicate according to the second processing timeline based on determining that a length of the CORESET associated with the first PDCCH occasion satisfies (e.g., exceeds) a threshold.

Figure 6:
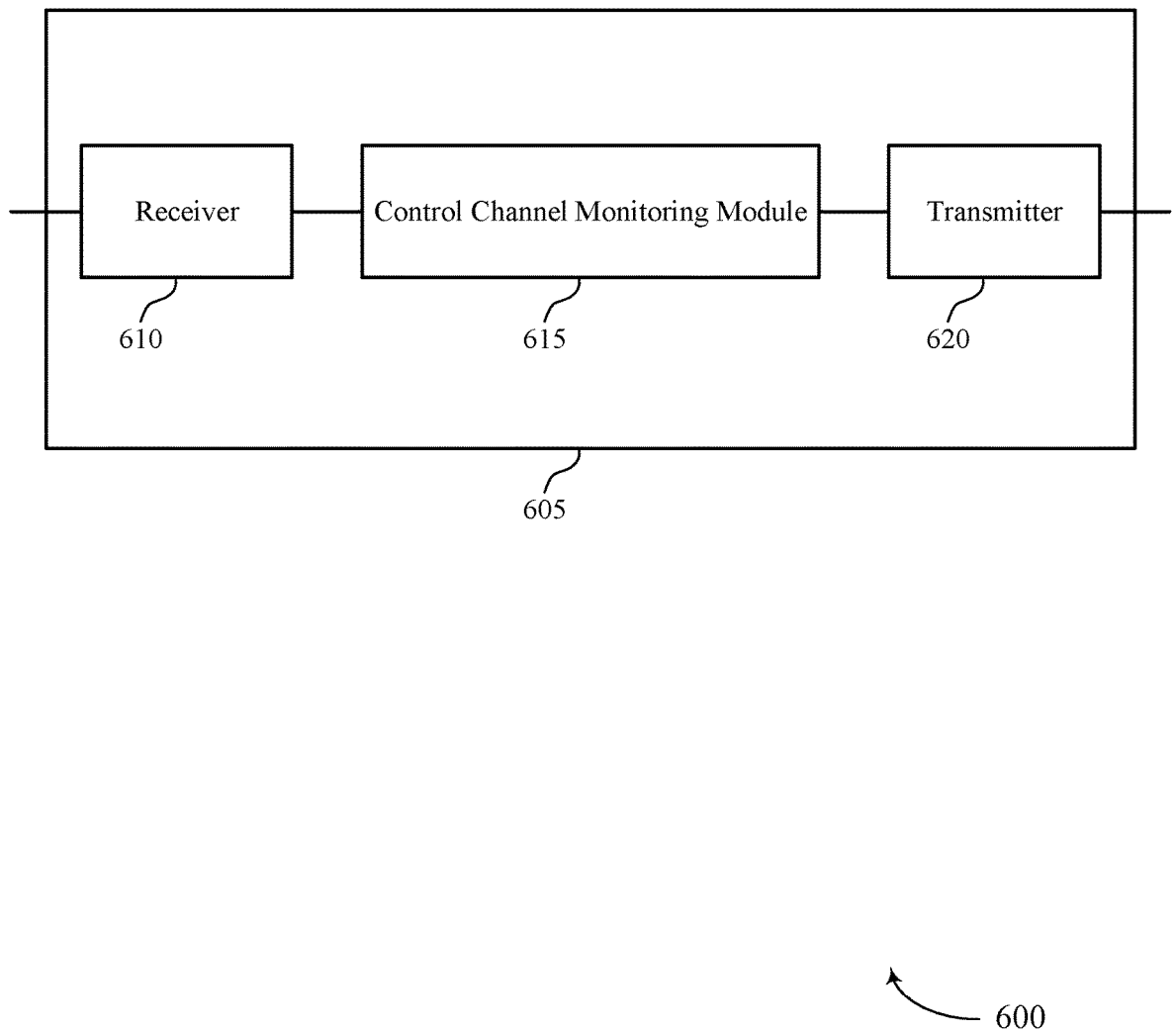
FIGS. 6 and 7 show block diagrams of devices that support control channel limitations for enhanced low latency processing in accordance with aspects of the present disclosure.

FIG. 6 shows a block diagram 600 of a device 605 that supports control channel limitations for enhanced low latency processing in accordance with aspects of the present disclosure. The device 605 may be an example of aspects of a UE 115 as described herein. The device 605 may include a receiver 610, a control channel monitoring module 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to control channel limitations for enhanced low latency processing, etc.). Information may be passed on to other components of the device 605. The receiver 610 may be an example of aspects of the transceiver 920 described with reference to FIG. 9. The receiver 610 may utilize a single antenna or a set of antennas.

The control channel monitoring module 615 may identify a set of PDCCH occasions for a slot, each PDCCH occasion associated with one of a set of CORESETs and one of a set of search space sets, determine a first configuration for monitoring the set of PDCCH occasions, the first configuration including a threshold number of PDCCH candidates, or a threshold number of non-overlapping CCEs, or a combination thereof, within the slot, and determine a second configuration for monitoring PDCCH occasions of the set of PDCCH occasions that overlap for at least one symbol period during the slot. The control channel monitoring module 615 may monitor, in accordance with the first configuration and the second configuration, for control information during the set of PDCCH occasions and decode the control information identified within a first PDCCH occasion of the set of PDCCH occasions. The control channel monitoring module 615 may be an example of aspects of the control channel monitoring module 910 described herein.

The control channel monitoring module 615 as described herein may be implemented to realize one or more potential advantages. One implementation may allow the device 605 to monitor PDCCH occasions with different timelines based on the number of overlapping PDCCH candidates, overlapping CCEs, or both within the PDCCH occasion. Accordingly, the device 605 may support low latency or large workload operations depending on the configuration of the device 605 and the number of overlapping PDCCH candidates, the number of overlapping CCEs, or both.

If the device 605 determines that the number of overlapping PDCCH candidates, overlapping CCEs, or both is less than a threshold, the device 605 may support improved system efficiency by reducing the processing duration at the device 605. For example, the device 605 may implement an enhanced URLLC timeline supporting faster processing and low latency, which may lead to time and power savings. Additionally, by determining that the number of overlapping PDCCH candidates, overlapping CCEs, or both is less than the threshold at the symbol level, the device 605 may support improved efficiency related to lower latency by configuring the device 605 for different processing timelines at the symbol level.

Based on configuring the device 605 for different processing timelines to support low latency operations, a processor of the device 605 may determine that a threshold of the second configuration is satisfied for at least one symbol period and may prune at least one PDCCH candidate. By reducing the number of PDCCH decoding candidates, the number of computations the processor of the device 605 performs may be reduced. Additionally, the shorter processing timeline may reduce an amount of time that the device 605 turns on processing units for monitoring PDCCH decoding candidates. As such, the processor of the device 605 may experience reduced computational complexities and reduced processing overhead.

The control channel monitoring module 615, or its sub-components, may be implemented in hardware, code (e.g., software or firmware) executed by a processor, or any combination thereof. If implemented in code executed by a processor, the functions of the control channel monitoring module 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The control channel monitoring module 615, or its sub-components, may be physically located at various positions, including being distributed such that portions of functions are implemented at different physical locations by one or more physical components. In some examples, the control channel monitoring module 615, or its sub-components, may be a separate and distinct component in accordance with various aspects of the present disclosure. In some examples, the control channel monitoring module 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
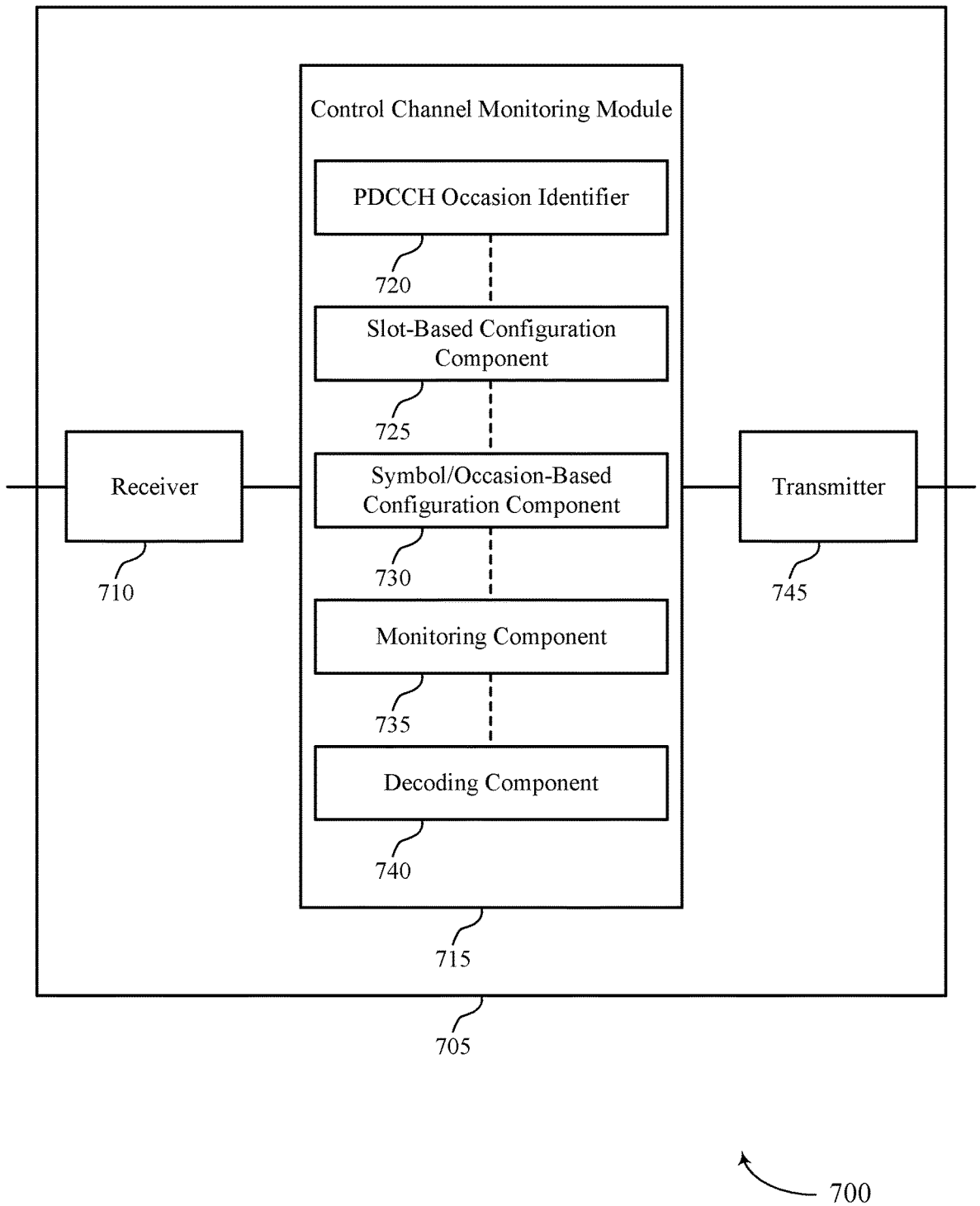

FIG. 7 shows a block diagram 700 of a device 705 that supports control channel limitations for enhanced low latency processing in accordance with aspects of the present disclosure. The device 705 may be an example of aspects of a device 605, or a UE 115 as described herein. The device 705 may include a receiver 710, a control channel monitoring module 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to control channel limitations for enhanced low latency processing, etc.). Information may be passed on to other components of the device 705. The receiver 710 may be an example of aspects of the transceiver 920 described with reference to FIG. 9. The receiver 710 may utilize a single antenna or a set of antennas.

The control channel monitoring module 715 may be an example of aspects of the control channel monitoring module 615 as described herein. The control channel monitoring module 715 may include a PDCCH occasion identifier 720, a slot-based configuration component 725, a symbol/occasion-based configuration component 730, a monitoring component 735, and a decoding component 740. The control channel monitoring module 715 may be an example of aspects of the control channel monitoring module 910 described herein.

The PDCCH occasion identifier 720 may identify a set of PDCCH occasions for a slot, each PDCCH occasion associated with one of a set of CORESETs and one of a set of search space sets.

The slot-based configuration component 725 may determine a first configuration for monitoring the set of PDCCH occasions, the first configuration including a threshold number of PDCCH candidates, or a threshold number of non-overlapping CCEs, or a combination thereof, within the slot. The symbol/occasion-based configuration component 730 may determine a second configuration for monitoring PDCCH occasions of the set of PDCCH occasions that overlap for at least one symbol period during the slot.

The monitoring component 735 may monitor, in accordance with the first configuration and the second configuration, for control information during the set of PDCCH occasions. The decoding component 740 may decode the control information identified within a first PDCCH occasion of the set of PDCCH occasions.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
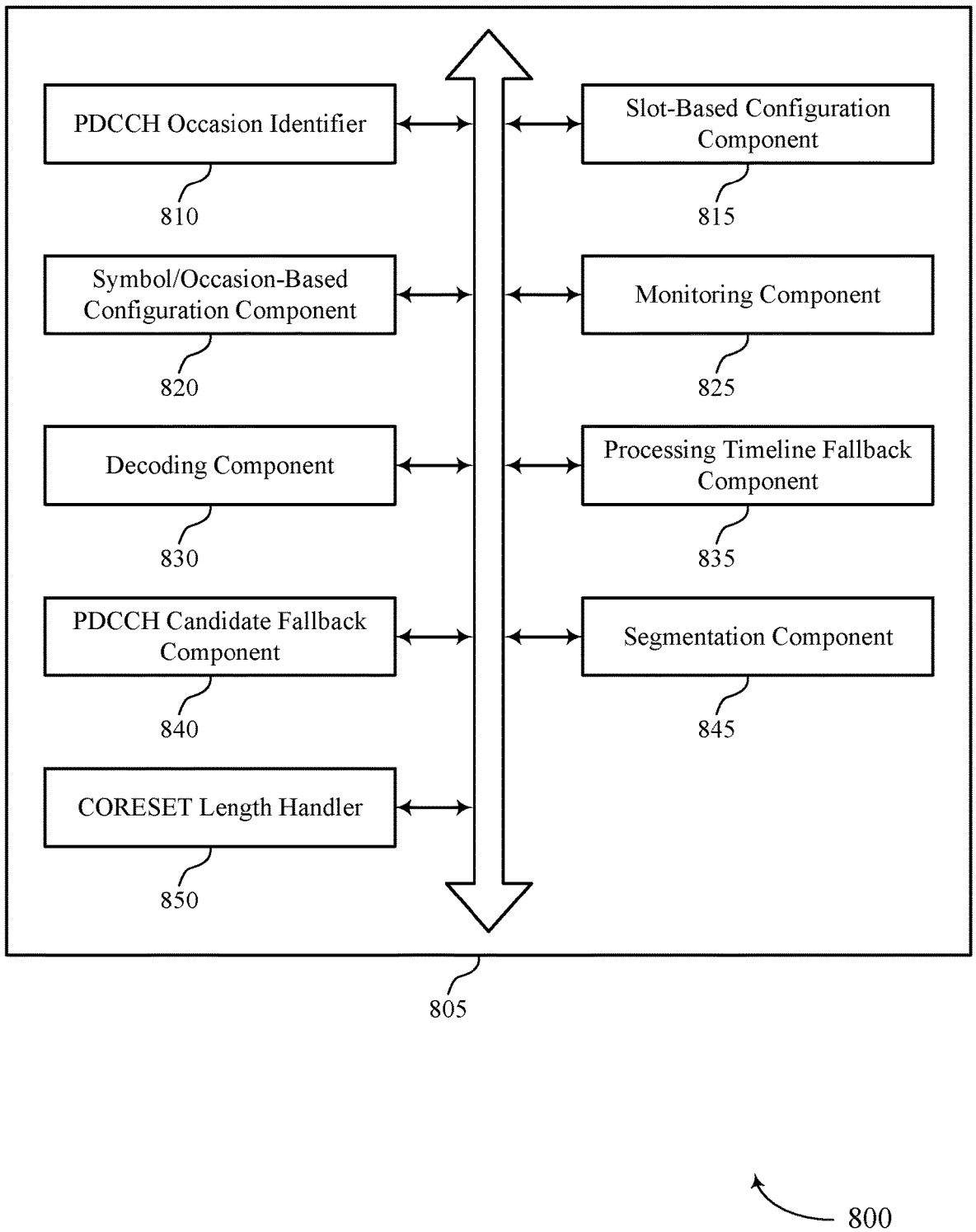
FIG. 8 shows a block diagram of a control channel monitoring module that supports control channel limitations for enhanced low latency processing in accordance with aspects of the present disclosure.

FIG. 8 shows a block diagram 800 of a control channel monitoring module 805 that supports control channel limitations for enhanced low latency processing in accordance with aspects of the present disclosure. The control channel monitoring module 805 may be an example of aspects of a control channel monitoring module 615, a control channel monitoring module 715, or a control channel monitoring module 910 described herein. The control channel monitoring module 805 may include a PDCCH occasion identifier 810, a slot-based configuration component 815, a symbol/occasion-based configuration component 820, a monitoring component 825, a decoding component 830, a processing timeline fallback component 835, a PDCCH candidate fallback component 840, a segmentation component 845, and a CORESET length handler 850. Each of these modules may communicate, directly or indirectly, with one another (e.g., via one or more buses).

The PDCCH occasion identifier 810 may identify a set of PDCCH occasions for a slot, each PDCCH occasion associated with one of a set of CORESETs and one of a set of search space sets.

The slot-based configuration component 815 may determine a first configuration for monitoring the set of PDCCH occasions, the first configuration including a threshold number of PDCCH candidates, or a threshold number of non-overlapping CCEs, or a combination thereof, within the slot.

The symbol/occasion-based configuration component 820 may determine a second configuration for monitoring PDCCH occasions of the set of PDCCH occasions that overlap for at least one symbol period during the slot. In some cases, the second configuration includes a threshold number of PDCCH candidates within the PDCCH occasions that overlap for the at least one symbol period during the slot. Additionally or alternatively, the second configuration includes a threshold number of frequency resources spanned by the PDCCH occasions within each symbol period of the at least one symbol period. In some cases, the second configuration includes a threshold number of frequency resources including a reference signal associated with demodulating PDCCH candidates in the set of PDCCH occasions. The reference signal may be transmitted in each cluster of each CORESET of the set of CORESETs having one or more CCEs of the set of PDCCH occasions.

In some cases, the second configuration includes a threshold, the threshold being applied for each of a set of active BWPs of a carrier, for each carrier of a set of configured carriers, or for a group of carriers. In some examples, the symbol/occasion-based configuration component 820 may determine a metric for the PDCCH occasions based on a sum of PDCCH candidates or frequency resources across carriers of the group of carriers sharing a numerology for the PDCCH occasions. In some cases, the second configuration includes a threshold that is based on an SCS for the set of CORESETs. In some cases, the second configuration includes a threshold that is based on a number of PDCCH occasions.

The monitoring component 825 may monitor, in accordance with the first configuration and the second configuration, for control information during the set of PDCCH occasions. In some cases, the monitoring may include applying a threshold of the second configuration to PDCCH occasions associated with a subset of the set of CORESETs that are associated with a first protocol type. The decoding component 830 may decode the control information identified within a first PDCCH occasion of the set of PDCCH occasions.

The processing timeline fallback component 835 may identify that the first PDCCH occasion is associated with a first processing timeline, the first PDCCH occasion overlapping with a second PDCCH occasion of the set of PDCCH occasions. In some examples, the processing timeline fallback component 835 may communicate, based on the control information, according to a second processing timeline based on determining that a threshold of the second configuration is satisfied for the at least one symbol period.

The PDCCH candidate fallback component 840 may determine that a threshold of the second configuration is satisfied for the at least one symbol period. In some examples, the monitoring may involve the PDCCH candidate fallback component 840 pruning at least one PDCCH decoding candidate from at least one of the PDCCH occasions that overlap for the at least one symbol period based on a priority of the set of search space sets. In some cases, the priority of the set of search space sets is based on a protocol type associated with the PDCCH occasions that overlap for the at least one symbol period.

The segmentation component 845 may determine a per symbol group metric for the PDCCH occasions based on a segmentation of a sum of PDCCH candidates or frequency resources across symbol groups of the at least one symbol period. In some cases, each of the symbol groups of the at least one symbol period corresponds to a single symbol period.

In some cases, the CORESET length handler 850 may identify that the first PDCCH occasion is associated with a first processing timeline. In some examples, the CORESET length handler 850 may communicate, based on the control information, according to a second processing timeline based on determining that a length of a CORESET associated with the first PDCCH occasion satisfies a threshold.

In other cases, the CORESET length handler 850 may identify a DCI format or an RNTI associated with a first search space set of the set of search space sets is associated with a first processing timeline. In some examples, the CORESET length handler 850 may suppress monitoring for the DCI format or the RNTI based on determining that a length of a CORESET associated with the first PDCCH occasion satisfies a threshold.

Figure 9:
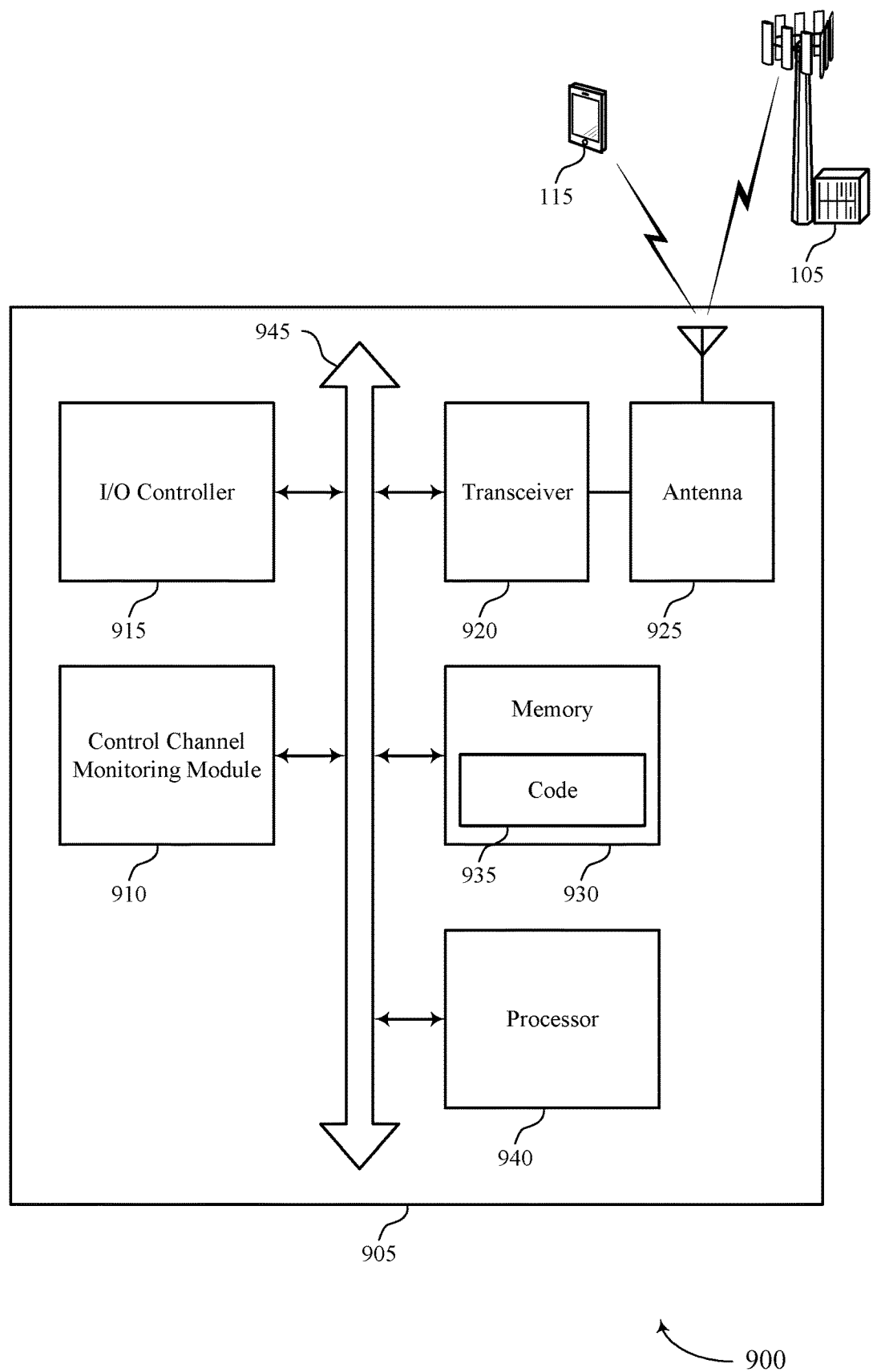
FIG. 9 shows a diagram of a system including a device that supports control channel limitations for enhanced low latency processing in accordance with aspects of the present disclosure.

FIG. 9 shows a diagram of a system 900 including a device 905 that supports control channel limitations for enhanced low latency processing in accordance with aspects of the present disclosure. The device 905 may be an example of or include the components of device 605, device 705, or a UE 115 as described herein. The device 905 may include components for bi-directional voice and data communications including components for transmitting and receiving communications, including a control channel monitoring module 910, an I/O controller 915, a transceiver 920, an antenna 925, memory 930, and a processor 940. These components may be in electronic communication via one or more buses (e.g., bus 945).

The control channel monitoring module 910 may identify a set of PDCCH occasions for a slot, each PDCCH occasion associated with one of a set of CORESETs and one of a set of search space sets, determine a first configuration for monitoring the set of PDCCH occasions, the first configuration including a threshold number of PDCCH candidates, or a threshold number of non-overlapping CCEs, or a combination thereof, within the slot, and determine a second configuration for monitoring PDCCH occasions of the set of PDCCH occasions that overlap for at least one symbol period during the slot. The control channel monitoring module 910 may monitor, in accordance with the first configuration and the second configuration, for control information during the set of PDCCH occasions and decode the control information identified within a first PDCCH occasion of the set of PDCCH occasions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting control channel limitations for enhanced low latency processing).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
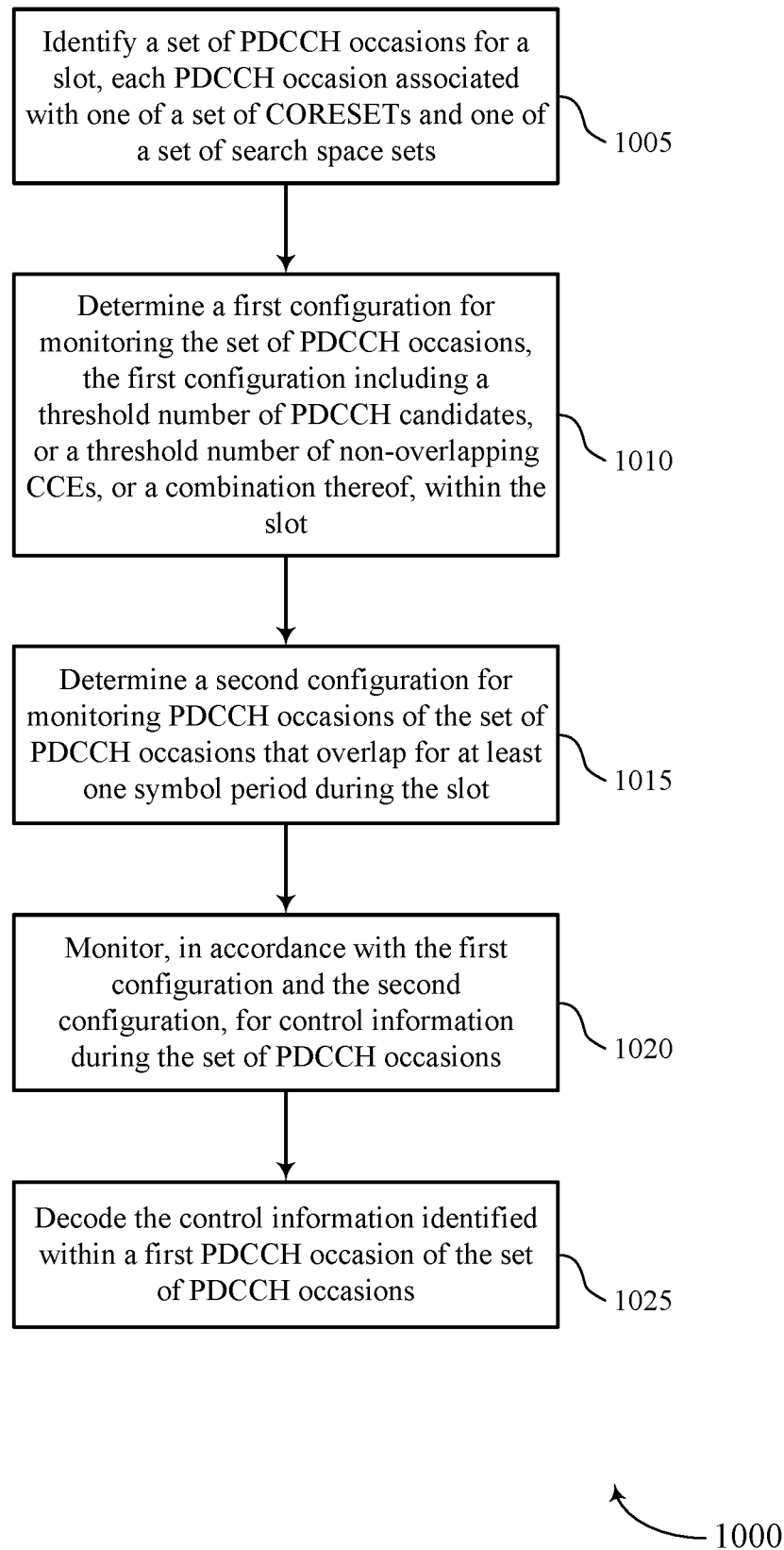
FIGS. 10 through 12 show flowcharts illustrating methods that support control channel limitations for enhanced low latency processing in accordance with aspects of the present disclosure.

FIG. 10 shows a flowchart illustrating a method 1000 that supports control channel limitations for enhanced low latency processing in accordance with aspects of the present disclosure. The operations of method 1000 may be implemented by a UE 115 or its components as described herein. For example, the operations of method 1000 may be performed by a control channel monitoring module as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may identify a set of PDCCH occasions for a slot, each PDCCH occasion associated with one of a set of CORESETs and one of a set of search space sets. The operations of 1005 may be performed according to the methods described herein. In some examples, aspects of the operations of 1005 may be performed by a PDCCH occasion identifier as described with reference to FIGS. 6 through 9.

At 1010, the UE may determine a first configuration for monitoring the set of PDCCH occasions, the first configuration including a threshold number of PDCCH candidates, or a threshold number of non-overlapping CCEs, or a combination thereof, within the slot. The operations of 1010 may be performed according to the methods described herein. In some examples, aspects of the operations of 1010 may be performed by a slot-based configuration component as described with reference to FIGS. 6 through 9.

At 1015, the UE may determine a second configuration for monitoring PDCCH occasions of the set of PDCCH occasions that overlap for at least one symbol period during the slot. The operations of 1015 may be performed according to the methods described herein. In some examples, aspects of the operations of 1015 may be performed by a symbol/occasion-based configuration component as described with reference to FIGS. 6 through 9.

At 1020, the UE may monitor, in accordance with the first configuration and the second configuration, for control information during the set of PDCCH occasions. The operations of 1020 may be performed according to the methods described herein. In some examples, aspects of the operations of 1020 may be performed by a monitoring component as described with reference to FIGS. 6 through 9.

At 1025, the UE may decode the control information identified within a first PDCCH occasion of the set of PDCCH occasions. The operations of 1025 may be performed according to the methods described herein. In some examples, aspects of the operations of 1025 may be performed by a decoding component as described with reference to FIGS. 6 through 9.

Figure 11:
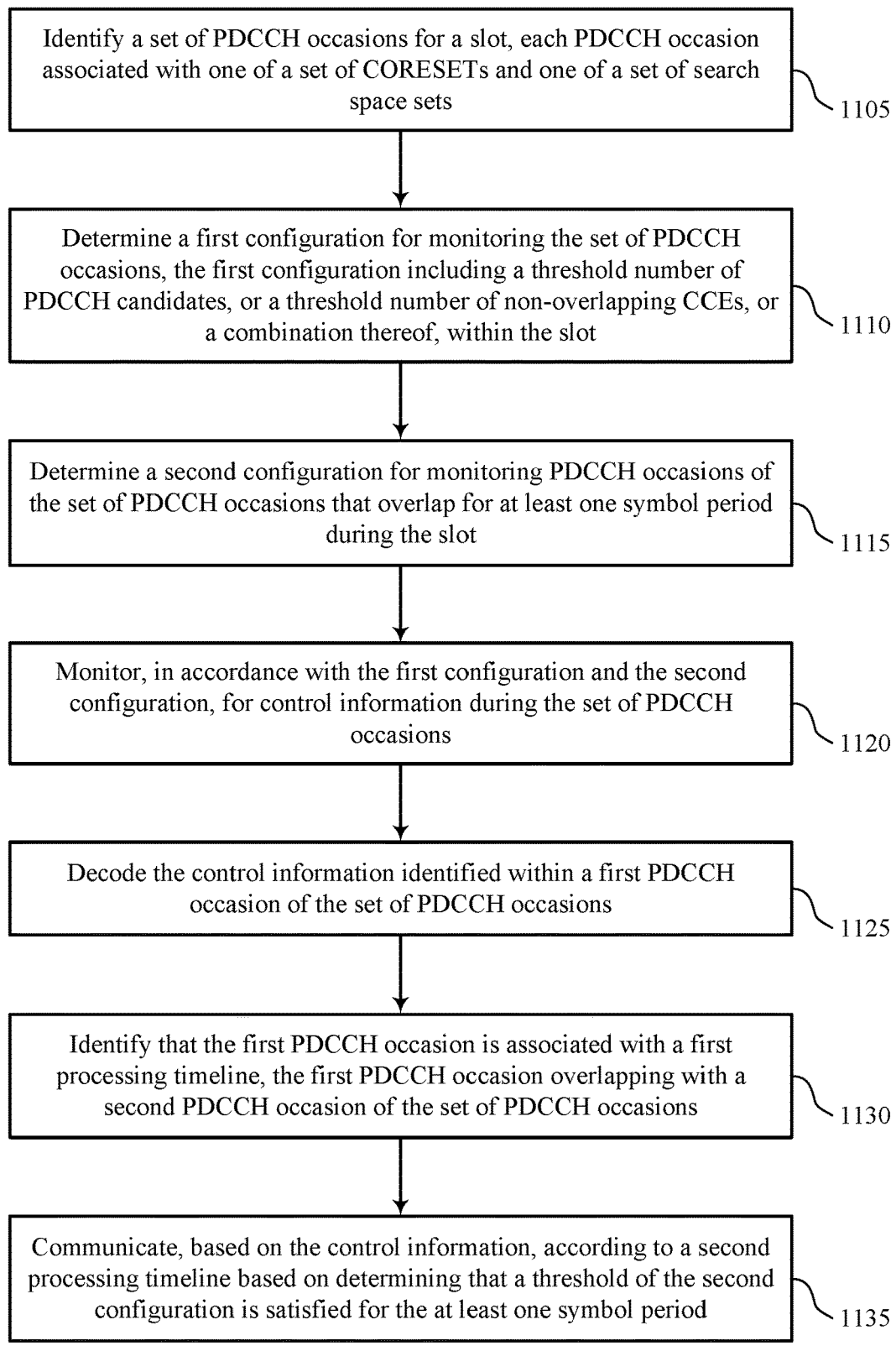

FIG. 11 shows a flowchart illustrating a method 1100 that supports control channel limitations for enhanced low latency processing in accordance with aspects of the present disclosure. The operations of method 1100 may be implemented by a UE 115 or its components as described herein. For example, the operations of method 1100 may be performed by a control channel monitoring module as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may identify a set of PDCCH occasions for a slot, each PDCCH occasion associated with one of a set of CORESETs and one of a set of search space sets. The operations of 1105 may be performed according to the methods described herein. In some examples, aspects of the operations of 1105 may be performed by a PDCCH occasion identifier as described with reference to FIGS. 6 through 9.

At 1110, the UE may determine a first configuration for monitoring the set of PDCCH occasions, the first configuration including a threshold number of PDCCH candidates, or a threshold number of non-overlapping CCEs, or a combination thereof, within the slot. The operations of 1110 may be performed according to the methods described herein. In some examples, aspects of the operations of 1110 may be performed by a slot-based configuration component as described with reference to FIGS. 6 through 9.

At 1115, the UE may determine a second configuration for monitoring PDCCH occasions of the set of PDCCH occasions that overlap for at least one symbol period during the slot. The operations of 1115 may be performed according to the methods described herein. In some examples, aspects of the operations of 1115 may be performed by a symbol/occasion-based configuration component as described with reference to FIGS. 6 through 9.

At 1120, the UE may monitor, in accordance with the first configuration and the second configuration, for control information during the set of PDCCH occasions. The operations of 1120 may be performed according to the methods described herein. In some examples, aspects of the operations of 1120 may be performed by a monitoring component as described with reference to FIGS. 6 through 9.

At 1125, the UE may decode the control information identified within a first PDCCH occasion of the set of PDCCH occasions. The operations of 1125 may be performed according to the methods described herein. In some examples, aspects of the operations of 1125 may be performed by a decoding component as described with reference to FIGS. 6 through 9.

At 1130, the UE may identify that the first PDCCH occasion is associated with a first processing timeline, the first PDCCH occasion overlapping with a second PDCCH occasion of the set of PDCCH occasions. The operations of 1130 may be performed according to the methods described herein. In some examples, aspects of the operations of 1130 may be performed by a processing timeline fallback component as described with reference to FIGS. 6 through 9.

At 1135, the UE may communicate, based on the control information, according to a second processing timeline based on determining that a threshold of the second configuration is satisfied for the at least one symbol period. The operations of 1135 may be performed according to the methods described herein. In some examples, aspects of the operations of 1135 may be performed by a processing timeline fallback component as described with reference to FIGS. 6 through 9.

Figure 12:
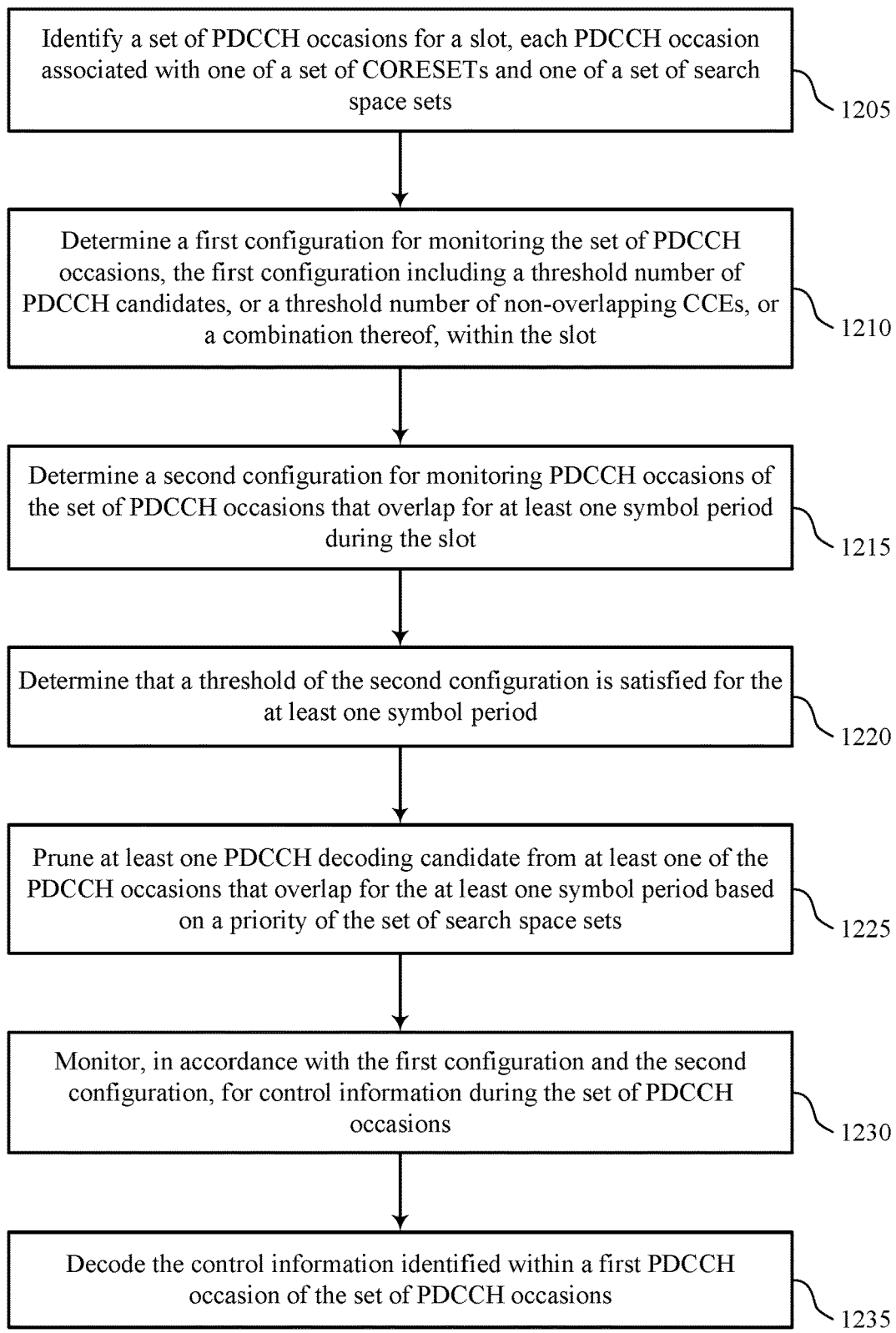

FIG. 12 shows a flowchart illustrating a method 1200 that supports control channel limitations for enhanced low latency processing in accordance with aspects of the present disclosure. The operations of method 1200 may be implemented by a UE 115 or its components as described herein. For example, the operations of method 1200 may be performed by a control channel monitoring module as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may identify a set of PDCCH occasions for a slot, each PDCCH occasion associated with one of a set of CORESETs and one of a set of search space sets. The operations of 1205 may be performed according to the methods described herein. In some examples, aspects of the operations of 1205 may be performed by a PDCCH occasion identifier as described with reference to FIGS. 6 through 9.

At 1210, the UE may determine a first configuration for monitoring the set of PDCCH occasions, the first configuration including a threshold number of PDCCH candidates, or a threshold number of non-overlapping CCEs, or a combination thereof, within the slot. The operations of 1210 may be performed according to the methods described herein. In some examples, aspects of the operations of 1210 may be performed by a slot-based configuration component as described with reference to FIGS. 6 through 9.

At 1215, the UE may determine a second configuration for monitoring PDCCH occasions of the set of PDCCH occasions that overlap for at least one symbol period during the slot. The operations of 1215 may be performed according to the methods described herein. In some examples, aspects of the operations of 1215 may be performed by a symbol/occasion-based configuration component as described with reference to FIGS. 6 through 9.

At 1220, the UE may determine that a threshold of the second configuration is satisfied for the at least one symbol period. The operations of 1220 may be performed according to the methods described herein. In some examples, aspects of the operations of 1220 may be performed by a PDCCH candidate fallback component as described with reference to FIGS. 6 through 9.

At 1225, the UE may prune at least one PDCCH decoding candidate from at least one of the PDCCH occasions that overlap for the at least one symbol period based on a priority of the set of search space sets. The operations of 1225 may be performed according to the methods described herein. In some examples, aspects of the operations of 1225 may be performed by a PDCCH candidate fallback component as described with reference to FIGS. 6 through 9.

At 1230, the UE may monitor, in accordance with the first configuration and the second configuration, for control information during the set of PDCCH occasions (e.g., after pruning the at least one PDCCH decoding candidate from the set of PDCCH occasions). The operations of 1230 may be performed according to the methods described herein. In some examples, aspects of the operations of 1230 may be performed by a monitoring component as described with reference to FIGS. 6 through 9.

At 1235, the UE may decode the control information identified within a first PDCCH occasion of the set of PDCCH occasions. The operations of 1235 may be performed according to the methods described herein. In some examples, aspects of the operations of 1235 may be performed by a decoding component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a set of physical downlink control channel (PDCCH) occasions for a slot, each PDCCH occasion associated with one of a plurality of control resource sets and one of a plurality of search space sets;
determining a first configuration for monitoring the set of PDCCH occasions, the first configuration comprising a threshold number of PDCCH candidates, or a threshold number of non-overlapping control channel elements, or a combination thereof, within the slot;
determining a second configuration for monitoring PDCCH occasions of the set of PDCCH occasions that overlap for at least one symbol period during the slot;
monitoring, in accordance with the first configuration and the second configuration, for control information during the set of PDCCH occasions; and
decoding the control information identified within a first PDCCH occasion of the set of PDCCH occasions.

2. The method of claim 1, further comprising:
identifying that the first PDCCH occasion is associated with a first processing timeline, the first PDCCH occasion overlapping with a second PDCCH occasion of the set of PDCCH occasions; and
communicating, based at least in part on the control information, according to a second processing timeline based at least in part on determining that a threshold of the second configuration is satisfied for the at least one symbol period.

3. The method of claim 1, further comprising:
determining that a threshold of the second configuration is satisfied for the at least one symbol period, wherein the monitoring comprises pruning at least one PDCCH decoding candidate from at least one of the PDCCH occasions that overlap for the at least one symbol period based at least in part on a priority of the plurality of search space sets.

4. The method of claim 3, wherein the priority of the plurality of search space sets is based at least in part on a protocol type associated with the PDCCH occasions that overlap for the at least one symbol period.

5. The method of claim 1, wherein the second configuration comprises a threshold number of PDCCH candidates within the PDCCH occasions that overlap for the at least one symbol period during the slot.

6. The method of claim 1, wherein the second configuration comprises a threshold number of frequency resources spanned by the PDCCH occasions within each symbol period of the at least one symbol period.

7. The method of claim 1, wherein the second configuration comprises a threshold number of frequency resources comprising a reference signal associated with demodulating PDCCH candidates in the set of PDCCH occasions.

8. The method of claim 7, wherein the reference signal is transmitted in each cluster of each control resource set of the plurality of control resource sets having one or more control channel elements of the set of PDCCH occasions.

9. The method of claim 1, further comprising:
determining a per symbol group metric for the PDCCH occasions based on a segmentation of a sum of PDCCH candidates or frequency resources across symbol groups of the at least one symbol period.

10. The method of claim 9, wherein each of the symbol groups of the at least one symbol period corresponds to a single symbol period.

11. The method of claim 1, wherein the second configuration comprises a threshold, the threshold being applied for each of a plurality of active bandwidth parts of a carrier, for each carrier of a plurality of configured carriers, or for a group of carriers.

12. The method of claim 11, further comprising:
determining a metric for the PDCCH occasions based on a sum of PDCCH candidates or frequency resources across carriers of the group of carriers sharing a numerology for the PDCCH occasions.

13. The method of claim 1, wherein the second configuration comprises a threshold that is based at least in part on a subcarrier spacing for the plurality of control resource sets.

14. The method of claim 1, wherein the monitoring comprises applying a threshold of the second configuration to PDCCH occasions associated with a subset of the plurality of control resource sets that are associated with a first protocol type.

15. The method of claim 1, wherein the second configuration comprises a threshold that is based at least in part on a number of PDCCH occasions.

16. The method of claim 1, further comprising:
identifying that the first PDCCH occasion is associated with a first processing timeline; and
communicating, based at least in part on the control information, according to a second processing timeline based at least in part on determining that a length of a control resource set associated with the first PDCCH occasion satisfies a threshold.

17. The method of claim 1, further comprising:
identifying a downlink control information (DCI) format or a radio network temporary identifier (RNTI) associated with a first search space set of the plurality of search space sets is associated with a first processing timeline; and
suppressing monitoring for the DCI format or the RNTI based at least in part on determining that a length of a control resource set associated with the first PDCCH occasion satisfies a threshold.

18. An apparatus for wireless communication, comprising:
a processor;
memory coupled with the processor; and
instructions stored in the memory and executable by the processor to cause the apparatus to:
identify a set of physical downlink control channel (PDCCH) occasions for a slot, each PDCCH occasion associated with one of a plurality of control resource sets and one of a plurality of search space sets;
determine a first configuration for monitoring the set of PDCCH occasions, the first configuration comprising a threshold number of PDCCH candidates, or a threshold number of non-overlapping control channel elements, or a combination thereof, within the slot;
determine a second configuration for monitoring PDCCH occasions of the set of PDCCH occasions that overlap for at least one symbol period during the slot;
monitor, in accordance with the first configuration and the second configuration, for control information during the set of PDCCH occasions; and
decode the control information identified within a first PDCCH occasion of the set of PDCCH occasions.

19. The apparatus of claim 18, wherein the instructions are further executable by the processor to cause the apparatus to:
identify that the first PDCCH occasion is associated with a first processing timeline, the first PDCCH occasion overlapping with a second PDCCH occasion of the set of PDCCH occasions; and
communicate, based at least in part on the control information, according to a second processing timeline based at least in part on determining that a threshold of the second configuration is satisfied for the at least one symbol period.

20. The apparatus of claim 18, wherein the instructions are further executable by the processor to cause the apparatus to:
determine that a threshold of the second configuration is satisfied for the at least one symbol period, wherein the monitoring comprises pruning at least one PDCCH decoding candidate from at least one of the PDCCH occasions that overlap for the at least one symbol period based at least in part on a priority of the plurality of search space sets.

21. The apparatus of claim 20, wherein the priority of the plurality of search space sets is based at least in part on a protocol type associated with the PDCCH occasions that overlap for the at least one symbol period.

22. The apparatus of claim 18, wherein the second configuration comprises a threshold number of PDCCH candidates within the PDCCH occasions that overlap for the at least one symbol period during the slot.

23. The apparatus of claim 18, wherein the second configuration comprises a threshold number of frequency resources spanned by the PDCCH occasions within each symbol period of the at least one symbol period.

24. The apparatus of claim 18, wherein the second configuration comprises a threshold number of frequency resources comprising a reference signal associated with demodulating PDCCH candidates in the set of PDCCH occasions.

25. The apparatus of claim 24, wherein the reference signal is transmitted in each cluster of each control resource set of the plurality of control resource sets having one or more control channel elements of the set of PDCCH occasions.

26. The apparatus of claim 18, wherein the instructions are further executable by the processor to cause the apparatus to:
determine a per symbol group metric for the PDCCH occasions based on a segmentation of a sum of PDCCH candidates or frequency resources across symbol groups of the at least one symbol period.

27. The apparatus of claim 18, wherein the instructions are further executable by the processor to cause the apparatus to:

identify that the first PDCCH occasion is associated with a first processing timeline; and communicate, based at least in part on the control information, according to a second processing timeline based at least in part on determining that a length of a control resource set associated with the first PDCCH occasion satisfies a threshold.

28. The apparatus of claim 18, wherein the instructions are further executable by the processor to cause the apparatus to:

identify a downlink control information (DCI) format or a radio network temporary identifier (RNTI) associated with a first search space set of the plurality of search space sets is associated with a first processing timeline; and suppress monitoring for the DCI format or the RNTI based at least in part on determining that a length of a control resource set associated with the first PDCCH occasion satisfies a threshold.

29. An apparatus for wireless communication, comprising:

means for identifying a set of physical downlink control channel (PDCCH) occasions for a slot, each PDCCH occasion associated with one of a plurality of control resource sets and one of a plurality of search space sets;

means for determining a first configuration for monitoring the set of PDCCH occasions, the first configuration comprising a threshold number of PDCCH candidates, or a threshold number of non-overlapping control channel elements, or a combination thereof, within the slot;

means for determining a second configuration for monitoring PDCCH occasions of the set of PDCCH occasions that overlap for at least one symbol period during the slot;

means for monitoring, in accordance with the first configuration and the second configuration, for control information during the set of PDCCH occasions; and means for decoding the control information identified within a first PDCCH occasion of the set of PDCCH occasions.

30. A non-transitory computer-readable medium storing code for wireless communication, the code comprising instructions executable by a processor to:

identify a set of physical downlink control channel (PDCCH) occasions for a slot, each PDCCH occasion associated with one of a plurality of control resource sets and one of a plurality of search space sets;

determine a first configuration for monitoring the set of PDCCH occasions, the first configuration comprising a threshold number of PDCCH candidates, or a threshold number of non-overlapping control channel elements, or a combination thereof, within the slot;

determine a second configuration for monitoring PDCCH occasions of the set of PDCCH occasions that overlap for at least one symbol period during the slot;

monitor, in accordance with the first configuration and the second configuration, for control information during the set of PDCCH occasions; and decode the control information identified within a first PDCCH occasion of the set of PDCCH occasions.

* * * * *